United States Patent
Shinohara et al.

(10) Patent No.: US 9,935,897 B2
(45) Date of Patent: *Apr. 3, 2018

(54) NETWORK SWITCHING DEVICE

(71) Applicant: ALAXALA NETWORKS CORPORATION, Kanagawa (JP)

(72) Inventors: Masayuki Shinohara, Kawasaki (JP); Nobuhito Matsuyama, Hadano (JP); Takayuki Muranaka, Kawasaki (JP); Isao Kimura, Yokohama (JP); Shinichi Akahane, Hachioji (JP)

(73) Assignee: ALAXALA NETWORKS CORPORATION, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/383,990

(22) Filed: Dec. 19, 2016

(65) Prior Publication Data

US 2017/0104693 A1    Apr. 13, 2017

Related U.S. Application Data

(63) Continuation of application No. 13/924,963, filed on Jun. 24, 2013, now Pat. No. 9,559,986, which is a (Continued)

(30) Foreign Application Priority Data

Feb. 27, 2006    (JP) ................... 2006-049955

(51) Int. Cl.
*H04M 1/00*    (2006.01)
*H04L 12/947*    (2013.01)
(Continued)

(52) U.S. Cl.
CPC .............. *H04L 49/25* (2013.01); *H04L 49/40* (2013.01); *H04L 49/552* (2013.01)

(58) Field of Classification Search
CPC .............. Y02B 60/50; H04W 52/0251; H04W 52/0209; H04W 52/0261; H04M 11/062; H04M 3/005; H04M 19/001; H04M 19/08
(Continued)

(56) References Cited

U.S. PATENT DOCUMENTS 5,351,296 A    9/1994    Sullivan
5,541,985 A    7/1996    Ishii et al.
(Continued)

FOREIGN PATENT DOCUMENTS

CN    101167373 A    4/2008
JP    2000-201166 A    7/2000
(Continued)

OTHER PUBLICATIONS

JP Office Action for Japanese Application No. 2006-049960, dated Feb. 15, 2014.

*Primary Examiner* — Rasha Al Aubaidi
(74) *Attorney, Agent, or Firm* — Baker Botts L.L.P.

(57) ABSTRACT

Network switching arrangements including: setting an operation mode of a target switching block to a operation mode that is different from an operation mode of a first switching block while the first switching block is handling a switching process, the target switching block being one switching block selected from second switching blocks; performing a switchover process including starting the switching process using the target switching block instead of the first switching block, after completion of setting the operation mode of the target switching block; and copying the switching information held by the first switching block to the target switching block, prior to starting the switching process using the target switching block, after completion of setting the operation mode of the target switching block.

12 Claims, 18 Drawing Sheets

Related U.S. Application Data continuation of application No. 13/149,029, filed on May 31, 2011, now Pat. No. 8,472,618, which is a continuation of application No. 11/487,992, filed on Jul. 18, 2006, now Pat. No. 7,953,220.

(51) Int. Cl.
*H04L 12/939* (2013.01)
*H04L 12/931* (2013.01)

(58) Field of Classification Search
USPC .................. 379/413, 399.01, 242; 455/127.5
See application file for complete search history.

(56) References Cited

U.S. PATENT DOCUMENTS

| | | |
|---|---|---|
| 7,224,492 B2 | 5/2007 | Orikasa |
| 7,408,961 B2 | 8/2008 | Kaku |
| 7,466,819 B2 | 12/2008 | Leh et al. |
| 7,734,938 B2 | 6/2010 | Kim |
| 2003/0163743 A1 | 8/2003 | Endo |
| 2004/0053643 A1 | 3/2004 | Kimura |
| 2004/0160898 A1 | 8/2004 | Lim et al. |
| 2004/0218634 A1 | 11/2004 | Peng et al. |
| 2007/0159970 A1 | 7/2007 | Chilukoor |

FOREIGN PATENT DOCUMENTS

| | | | |
|---|---|---|---|
| JP | 2001-320415 A | 11/2001 |
| JP | 2002-335262 A | 11/2002 |
| JP | 2003-069607 A | 3/2003 |
| JP | 2003-248524 A | 9/2003 |
| JP | 2005-123715 A | 5/2005 |
| JP | 2005-277694 A | 10/2005 |

Fig.4

| | | 17 |
|---|---|---|
| RUNNING MODE | NORMAL POWER FIXED RUNNING MODE | OFF |
| | LOW-POWER FIXED RUNNING MODE | ON |
| | TRAFFIC LOAD BASIS RUNNING MODE | OFF |
| | PERIODIC BASIS RUNNING MODE | OFF |
| | LINE SPEED BASIS RUNNING MODE | OFF |
| TRAFFIC LOAD BASIS SETTINGS | LESS THAN M (packets/sec) | LOW-FREQUENCY CLOCK OPERATION |
| | M OR GREATER | HIGH-FREQUENCY CLOCK OPERATION |
| PERIODIC BASIS SETTINGS | TIME T1 THROUGH TIME T2 | LOW-FREQUENCY CLOCK OPERATION |
| | TIME T2 THROUGH TIME T1 | HIGH-FREQUENCY CLOCK OPERATION |
| LINE SPEED BASIS SETTINGS | LESS THAN N (Mbps) | LOW-FREQUENCY CLOCK OPERATION |
| | N OR GREATER | HIGH-FREQUENCY CLOCK OPERATION |
| NON-USE RECORDS | INTERFACE BOARD | #3 |
| | PHYSICAL INTERFACE BLOCK | #2-2    #2-3 |

NETWORK SWITCHING DEVICE

CROSS-REFERENCE TO RELATED APPLICATION

This is a continuation of U.S. application Ser. No. 13/924,963, filed Jun. 24, 2013, which is a continuation of U.S. application Ser. No. 13/149,029, filed May 31, 2011 (now U.S. Pat. No. 8,472,618), which is a continuation of U.S. application Ser. No. 11/487,992, filed Jul. 18, 2006 (now U.S. Pat. No. 7,953,220). This application relates to and claims priority from Japanese Patent Application No. 2006-049955, filed on Feb. 27, 2006. The entirety of the contents and subject matter of all of the above is incorporated herein by reference.

BACKGROUND

Technical Field

The present invention relates to network switching devices, and in particular to reducing power consumption in network switching devices.

Description of the Related Art

A network switching device, including a switch and a router, is a critical device in a network system. In recent years there have been remarkable increases in performance and capacity of the network switching device accompanying an increase in data traffic sent through the network and accompanying an increase in size of the network. On the other hand, accompanying the increased performance and the increased capacity there has also been a tendency for increased power consumption in the network switching device as well, and controlling power consumption of the network switching device has become an issue from both the perspective of system operating costs and environmental protection.

Technologies that provide a normal mode and a low-power mode in devices that are connected together through a cable are known.

When mode is set in network switching device, problems may occur in the switching process due to the mode setting (for example, the switching process may be interrupted when the mode is being set), and there have been cases wherein this has resulted in extended interruption time of the switching process.

SUMMARY

An advantage of some aspects of the invention is to provide a technology that is able to control power consumption while preventing the interruption time of the switching process from becoming excessively long.

In an aspect of the present invention, there is provided a network switching device. The network switching device includes an interface block, a first switching block, one or more second switching blocks, and a system control block. The interface block has a plurality of physical interface blocks. The physical interface blocks are configured to connect to connection lines. The interface block is configured to send and receive, through the lines, packets having associated destination-address information. The first switching block is configured to perform switching-determination process that determine a connection line to which the received packets should be outputted, based on the destination-address information that is associated with the received packets. The second switching blocks are capable of performing the switching-determination process instead of the first switching block. The system control block is configured to control the operation of each of the blocks. The first switching block and the second switching block are each provided with a plurality of switchable determination-operation modes as operation modes for the switching-determination process. The plurality of determination-operation modes includes a first determination-operation mode and a second determination-operation mode with less power consumption than the first determination-operation mode. Furthermore, the system control block performs (A) a mode-process including setting the determination-operation mode of a target switching block to a determination-operation mode that is different from the determination-operation mode of the first switching block while the first switching block is handling the switching-determination process. The target switching block is one switching block selected from the second switching blocks. Furthermore, the system control block performs (B) a switchover process including starting the switching-determination process using the target switching block instead of the first switching block, after completion of the process of setting the determination-operation mode of the target switching block.

Regarding this network switching device, the determination-operation mode of the target switching block is set to a determination-operation mode that is different from the operation mode of the first switching block during the period wherein the first switching block handles the switching-determination process. Furthermore, the switching-determination process is started by the target switching block, instead of the first switching block, after completion of setting the operation mode of the target switching block. Thus, this network switching device makes it possible to changeover the determination-operation mode used for execution of the switching-determination process without setting the operation mode of the switching block in execution of the switching-determination process, nor interrupting the switching-determination process.

Note that the present invention can be embodied in a variety of forms, for example, may be embodied in the form of a control method and device for a network switching device, a computer program for realizing the functions of such method or device, a recording medium on which such computer program is recorded, a data signal that is incorporated into a carrier wave that includes such computer program, and so forth.

These and other objects, features, aspects, and advantages of the present invention will become more apparent from the following detailed description of the preferred embodiments with the accompanying drawings.

BRIEF DESCRIPTION OF THE DRAWINGS

FIG. 4 shows an explanatory diagram of one part of the contents of a settings file;

DESCRIPTION OF THE PREFERRED EMBODIMENT

Embodiments of the invention will be described below in the following order.
A. First Embodiment
B. Second Embodiment
C. Third Embodiment
D. Variations

A. First Embodiment

Structure of a Network Switching Device

Figure 1:
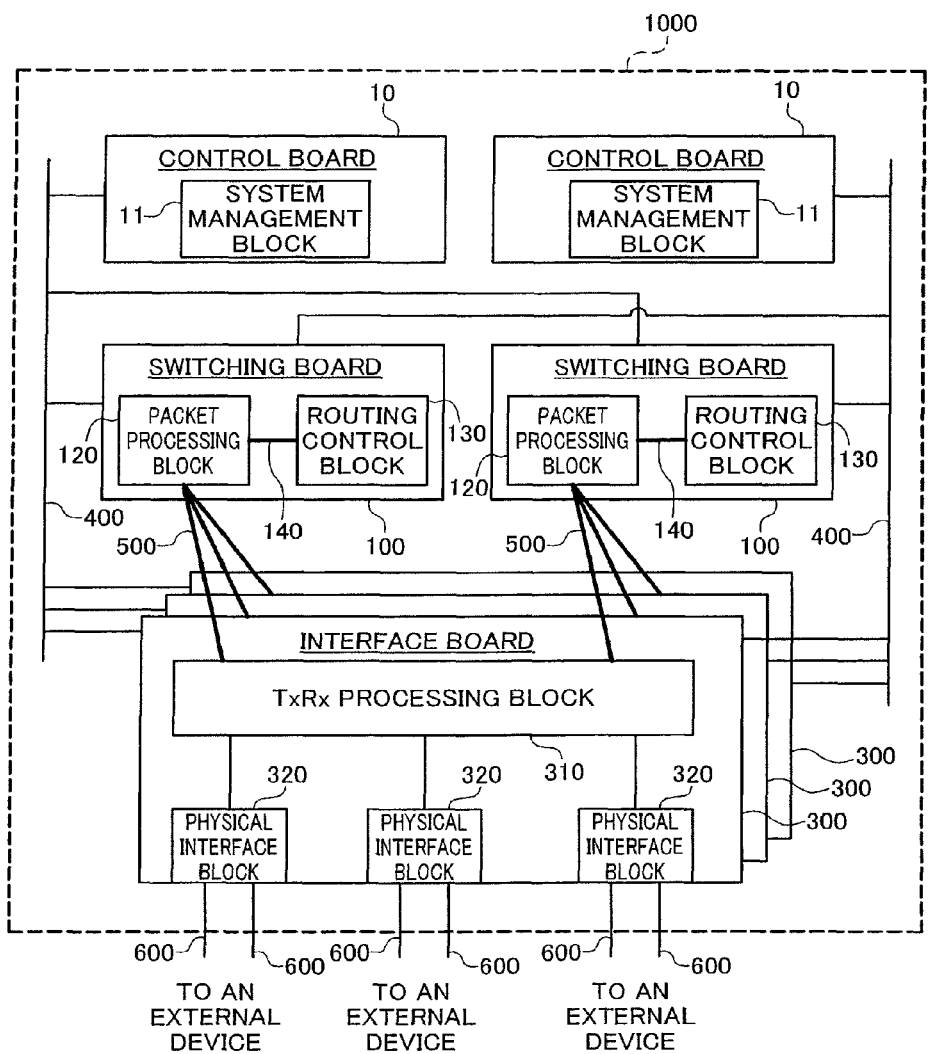
FIG. 1 shows a block diagram of the basic structure of a network device pertaining to an embodiment.
Figure 2:
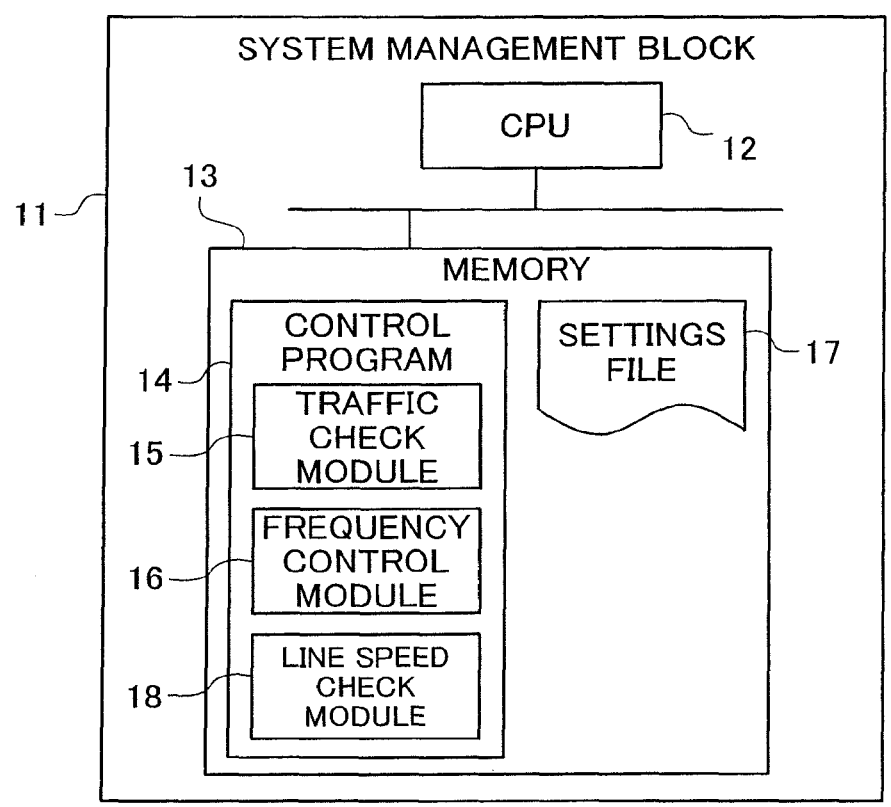
FIG. 2 shows a block diagram of the internal structure of the system management block.
Figure 3:
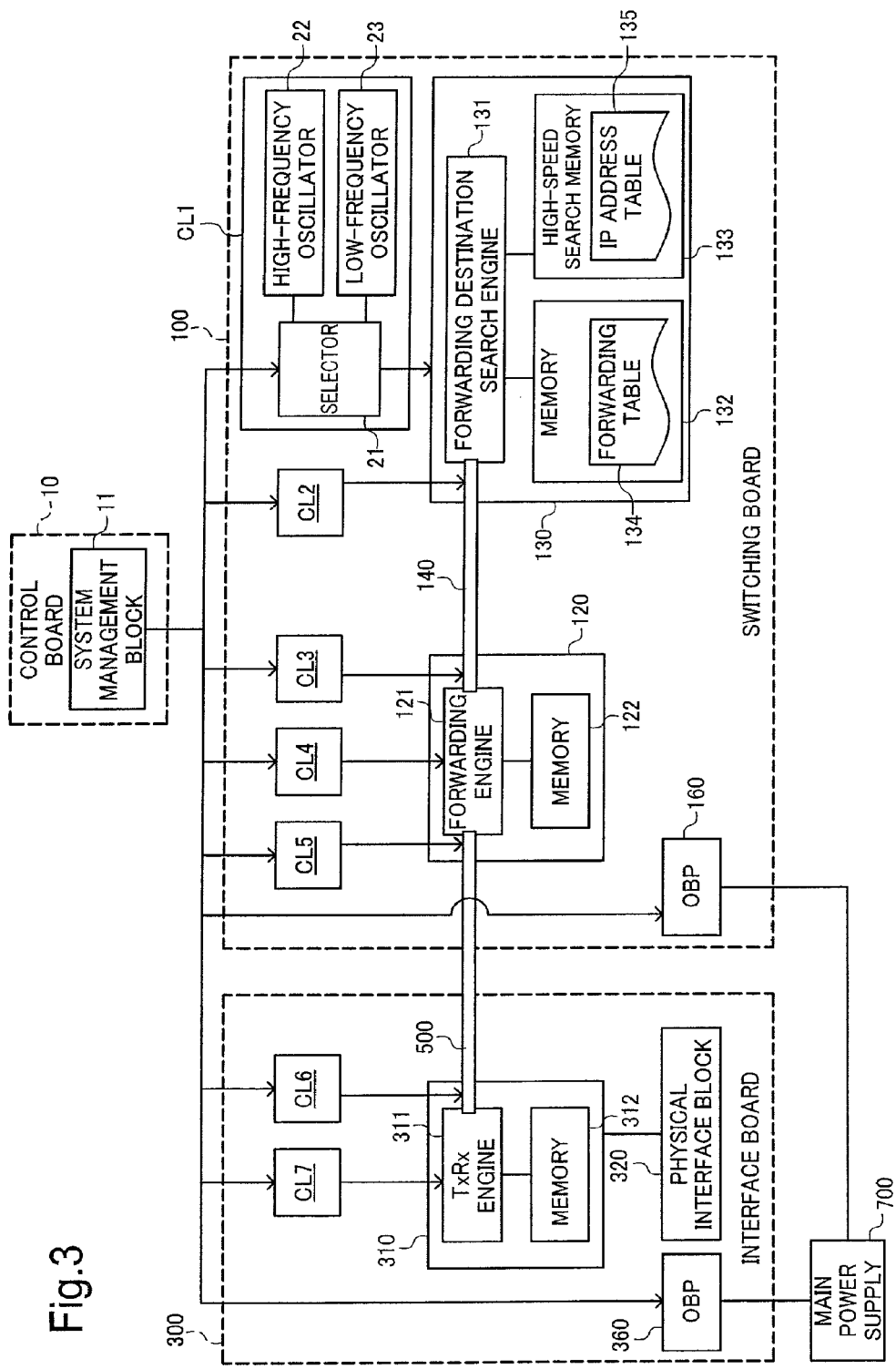
FIG. 3 shows a block diagram of the structure focusing on an interface board and a switching board.

The structure of a network switching device according to the embodiment will be explained in reference to FIG. 1 through FIG. 3. FIG. 1 shows a block diagram illustrating the basic structure of a network device pertaining to the embodiment. FIG. 2 shows a block diagram of the internal structure of a system management block. FIG. 3 shows a block diagram of the structure focusing on an interface board and a switching board.

As is shown in FIG. 1, the network switching device 1000 pertaining to the embodiment includes, primarily, a control board 10, a switching board 100, and an interface board 300. The control board 10 includes a system management block 11. The control board 10 is connected, so as to be able to communicate, through a control bus 400 to the switching board 100 and the interface board 300. The system management block 11 of the control board 10 sends control signals to each of the constituent elements of the interface board 300 and the switching board 100, and receives various type of information from each of these elements, through the control bus 400. In FIG. 1, two control boards 10 are provided in order to improve reliability through redundancy, where one is a active control board that is used at normal times, and the other is a standby control board that is used when a failure occurs in the active control board.

The system management block 11 is a controller for controlling the network switch 1000 as a whole. As shown in FIG. 2, the system management block 11 includes a central processing unit (CPU) 12 and a memory 13. The memory 13 stores a control program 14 and a settings file 17.

The CPU 12 executes the control program 14 to produce the functions of the system management block. The control program 14 includes a variety of modules, such as modules that perform process relate to routing protocol such as RIP (routing information protocol) or OSPF (open shortest path first), etc., but only those structures required for describing the embodiment have been selected for inclusion in the figure, and the detailed description of the invention describes the structures that are shown. The control program 14 includes a traffic check module 15, a frequency control module 16, and a line speed check module 18. The traffic check module 15 communicates with the switching board 100 to receive the traffic load for the packets that are processed by the switching board 100. A frequency control module 16 controls the setting/changing of the operating frequency (the clock signal frequency) of the various types of buses (explained below) and circuits included in the switching board 100 and the interface board 300. For example, in the startup process described below, the operating frequency is set depending on the operation mode. The line speed check module 18 checks the line speed of each line 600 that are connected to the respective physical interface blocks 320. The processes performed by these modules will be described in greater detail below.

In the embodiment, the network switching device 1000 includes two switching boards 100. The two switching boards 100 each have identical structures, and in FIG. 1, identical constituent elements are given identical codes. Each switching board 100 includes a packet processing block 120, and a routing control block 130. The packet processing block 120 is connected by an internal bus 140 so as to be able to communicate with the routing control block 130. The packet processing block 120 and the routing control block 130 are application-specific integrated circuits (ASIC), designed so as to produce the functions of these circuits described below.

In the embodiment, the network switching device 1000 includes three interface boards 300. Each of the three interface boards 300 has an identical structure, as so in FIG. 1 the internal structure is shown for only one of the interface boards 300, and the internal structure is omitted for the other interface boards 300. Each of the interface boards 300 includes a TxRx processing block 310 and a plurality of physical interface blocks 320. The TxRx processing block 310 is a custom-designed ASIC, as is the case for the packet processing block 120 and the routing control block 130. Each physical interface block 320 is connected to a network via a line 600, where physical interface conversion, such as optical/electrical conversion or electrical level conversion is performed for the packets carried on the lines 600 to convert to data that can be processed within the interface boards. Coaxial line, optical fibers, or the like, can be used for the lines 600.

Here the packet processing block 120 of the aforementioned switching board 100, and the TxRx processing block 310 of the interface board 300 are connected so as to be able to communicate with an external bus 500. Each packet processing block 120 can communicate with each of the TxRx processing blocks 310 in the three interface boards 300.

The structure of the network switching device 100 will be explained in greater detail, referencing FIG. 3, focusing on the switching board 100 and the interface board 300. The switching board 100 includes an on-board power supply (OBP) 160 and clock generators CL1 through CL5, in addition to the packet processing block 120, the routing control block 130, and the internal bus 140, described above.

Moreover, the interface board 300 includes an on-board power supply (OBP) 360, and clock generators CL6 and CL7 in addition to the TxRx processing block 310 and the physical interface blocks 320, described above.

The on-board power supply 160 supplies electric power to each of the constituent elements included in the switching board 100, and the on-board power supply 360 supplies electric power to each of the constituent elements included in the interface board 300, and are connected to a main power supply 700.

Each of the clock generators CL1 through CL7 includes a high-frequency oscillator 22, a low-frequency oscillator 23, and a selector 21, as shown for the example of the clock generator CL1 in FIG. 3. The high-frequency oscillator 22 and the low-frequency oscillator 23 use, for example, crystal oscillators, and produce clock signals of specific frequencies. The frequency of the clock signal produced by the high-frequency oscillator 22 is higher than the frequency of the clock signal produced by the low-frequency oscillator 23. In the below, the clock signal generated by the high-frequency clock oscillator 22 shall be termed the high-frequency clock signal HH, and the clock signal generated by the low-frequency oscillator 23 shall be termed the low-frequency clock signal HL. The frequency of the high-frequency clock signal HH is set to, for example, between 1.5 times and 3 times the frequency of the low-frequency clock signal HL. The selector 21 is controlled by the system management block 11 to cause either the high-frequency oscillator 22 or the low-frequency oscillator 23 to produce a clock signal, and then outputs that clock signal. As can be understood from the discussion above, each of the clock generators CL1 through CL7 can be controlled by the system management block 11 to output selectively a clock signal that is either the high-frequency clock signal HH or the low-frequency clock signal HL.

The clock generator CL1 provides a clock signal to the routing control block 130 of the switching board 100, where the routing control block 130 operates synchronized with the supplied clock signal. The clock generator CL2 and the clock generator CL3 supply clock signals to the internal bus 140 that connects the routing control block 130 to the packet processing block 120, and the internal bus 140 operates synchronized with the supplied clocks. The clock generator CL4 supplies a clock signal to the packet processing block 120 of the switching board 100, where the packet processing block 120 operates synchronized with the supplied clock. The clock generator CL5 and the clock generator CL6 supply clock signals to the external bus 500 that connects the packet processing block 120 of the switching board 100 and the TxRx processing block 310 of the interface board 300, where the external bus 500 operates synchronized with the supplied clock. The clock generator CL7 supplies a clock signal to the TxRx processing block 310 of the interface board 300, and the TxRx processing block 310 operates synchronized with the supplied clock circuit.

The structures of the TxRx processing block 310, the packet processing block 120, and the routing control block 130 will be explained in more detail. As is shown in FIG. 3, the TxRx processing block 310 includes a TxRx engine 311 and a memory 312. The packet processing block 120 includes a forwarding engine 121 and a memory 122. The routing control block 130 includes a forwarding destination search engine 131, a memory 132, and a high speed search memory 133. The high speed search memory 133 can use, for example, content-addressable memory (CAM). The memory 132 stores a forwarding table 134. The high speed search memory 133 stores an IP address table 135. The high speed search memory 133 is a memory that is provided with a search function, and can retrieve rapidly the IP addresses stored in the IP address table 135. Note that the forwarding table 134 and the IP address table 135 are distributed by the system management block 11.

A simple explanation of the packet switching process by the network switching device 1000 will be given next. The electronic signals for the data that is transmitted on the lines 600 are converted into bit data by the physical interface blocks 320 (in a process corresponding to the physical layer in the OSI (open system interconnection) reference model). The TxRx engine 311 of the TxRx processing block 310 recognizes the data block used in the data link layer in the OSI reference model by interpreting the bit data. The data block used in the data link layer is termed a "frame," where there are, for example, Ethernet™ frame. The TxRx engine 311 of the TxRx processing block 210 extracts, from the recognized frame, the data block that is used in the network layer and sends the extracted data block through the external bus 500 to the packet processing block 120. The data block used in the network layer is termed a "packet," such as IP packet. Conversely, the structure may be such that the TxRx engine 311 sends the frames, without extracting the packets, with the packets being extracted from the frames in the packet processing block 120. The memory 312 is used as a buffer area for the temporary storage of data such as frames, during processing by the TxRx engine 311. The packet processing block 120, of the plurality of packet processing blocks 120 to which the TxRx engine 311 of the TxRx processing block 310 will send the packet is either set in advance in the TxRx processing block 310 by the system management block 11, or is determined based on the header data of the frame.

The forwarding engine 121 of the packet processing block 120 stores temporarily, in the memory 122, the packets that have been sent from the TxRx engine 311. The forwarding engine 121 extracts the address data that is associated with the packets that have been sent (the address data corresponds to the "destination-address information" in the claims). The address data is, for example, header data that includes an IP address. The forwarding engine 121 sends the extracted address data through the internal bus 140 to the routing control block 130 within the same switching board 100.

The routing control block 130 searches the IP address table 135 that is stored in the high speed search memory 133 using the IP address that has been sent as the address data, as the search key. Because pointers are associated with each IP address stored in the IP address table 135, the routing control block 130 is able to acquire the pointer that is associated with the IP address that is the search key. The routing control block 130 references the forwarding table 134 stored in the memory 132 to acquire the packet processing data that is associated with the pointer. The packet processing data describes that data that specifies the packet forwarding address, or in other words, data that specifies the line that should send the packet. The data that specifies the line is, for example, the number of the TxRx processing block 310 and the number of the physical interface block 320 to which the applicable line is connected.

The routing control block 130 sends the acquired packet processing data through the internal bus 140 to the packet processing block 120. The forwarding engine 121 of the packet processing block 120 specifies, based on the acquired packet processing data, one TxRx processing block 310 to which the packet should be sent, from among the plurality of TxRx processing blocks 310 included in the network switching device 1000. The forwarding engine 121 sends the packet, along with the corresponding packet processing data, through the external bus 500 to the specified TxRx processing block 310. The TxRx processing block 310, upon receipt of the packet and the packet processing data, sends the packet from the physical interface block 320 specified based on the packet processing data. The series of packet switching processes described above are executed for each packet that is sent through the line 600 to the network switching device 1000.

Figure 5:
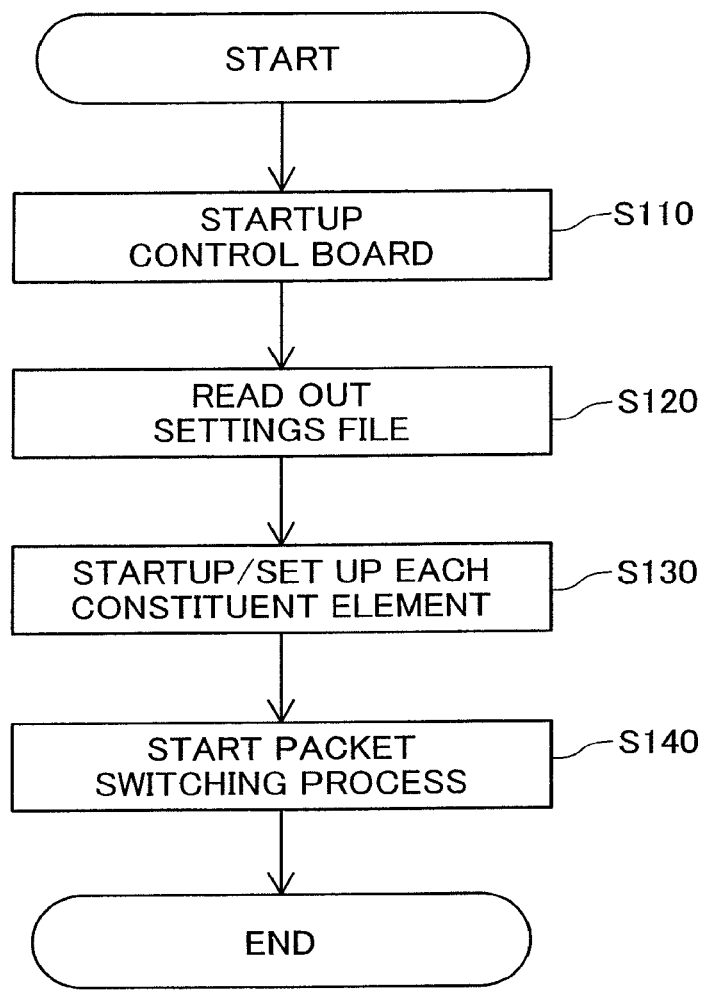
FIG. 5 shows a flowchart of a processing routine in a startup process.

FIG. 4 and FIG. 5 will be referenced next to explain the startup process for the network switching device 1000. FIG. 4 shows an explanatory diagram of one part of the contents of the settings file. FIG. 5 shows a flow chart of the processing routine in the startup process. The startup process is executed when the power supply is turned on or when there is a restart after a problem. When the startup process is initiated, the control board 10 is started up first (Step S110).

When the control board 10 is started up, the system management block 11 of the control board 10 reads out the settings file 17 that is stored in the memory 13 (Step S120). The settings file 17 is a file for storing the various types of setup information for the user to setup the networks switching device 1000. The settings file 17 may, in addition to what is shown in FIG. 4, include line information such as the types of lines, definitions of link aggregation functions, routing protocol information such as definitions pertaining to routing protocol, and so forth. FIG. 4 selectively shows that which is necessary to the description of the embodiment, the settings file 17, as shown in FIG. 4, includes running mode specification data that specifies the running mode of the network switching device 1000. The network switching device 1000 pertaining to the embodiment can operate in the following five running modes:
1. Normal power fixed running mode,
2. Low-power fixed running mode,
3. Traffic load basis running mode,
4. Periodic basis running mode, and
5. Line speed basis running mode.

Moreover, the settings file 17 may include, as settings pertaining to the traffic load basis running mode, specifications of ranges of traffic and specifications of operation modes corresponding to the ranges of traffic. The settings file 17 may include, as settings pertaining to the periodic basis running mode, specifications of time bands and specification of operation modes corresponding to the time bands. Moreover, the settings file 17 may include, as settings pertaining to the line speed basis running mode, specifications of line speed ranges and specifications of operation modes corresponding to the line speed ranges. These running modes will be described below.

The settings file 17 can include as well non-use record information. Non-use record information include information on "unused interfaces, and data on unused boards. The non-use record information is information for recording in advance unused interface boards and unused physical interface blocks. The non-use record information is information for specifying the unused interface boards when there are interface boards that are not used ("unused interface boards") among the plurality of interface boards 300, and may use, for example, the identification number of the interface board 300 (which, in the example shown in FIG. 4, is "#3"). Moreover, the non-use record information is information for specifying the unused physical interface blocks when there are physical interface block that are not used ("unused physical interface blocks") among the plurality of physical interface blocks 320, in the respective plurality of interface boards 300, and may use, for example, the identification number of the interface board 300 to which the unused physical interface block belongs, in combination with the identification number of the unused physical interface blocks (which, in the example shown in FIG. 4, are "#2-2" and "#2-3").

When the settings file 17 is read out, the system management block 11 executes the startup/setup of the each constituent elements in the network switching device 1000 based on the data that is recorded in the settings file 17 (Step S130). Here the various constituent elements for which the startup/setup is executed include not just the system management block 11, but also all constituent elements such as the packet processing block 120, the routing control block 130, and the internal bus 140 of the switching board 100, the TxRx processing block 310 of the interface board 300, and the external bus 500.

Explaining in detail, the system management block 11 controls the onboard power supply 160 of the switching board 100 to supply power to the packet processing block 120, the routing control block 130, and the internal bus 140. Similarly, the system management block 11 controls the on-board power supply 360 of the interface board 300 to supply power to the TxRx processing block 310 and the physical interface block 320. Similarly, power is also supplied through the onboard power supply 360 to the external bus 500. Note that the system management block 11 turns off the output from the onboard power supply 360 of the recorded interface board 300 when an interface board 300 is recorded as an unused interface board in the non-use record information in the settings file 17. The result is that the power supply to each of the elements included in the applicable interface board 300 (including the TxRx processing block 310, the physical interface block 320, and the clock generators CL6 and CL7) included in the applicable interface board 300 will be in a stopped state. Similarly, when a unused physical interface block is recorded in the non-use record information in the settings file 17, the system management block 11 either causes the power from the onboard power supply 360 to not be supplied to the physical interface block 320 that is recorded, or make the physical interface block that is recorded in a state in which the power consumption is reduced using an existing technology.

Furthermore, when the normal power fixed running mode is setup in the settings file 17, the system management block 11 controls the various clock generators CL1 through CL7 to produce and output high-frequency clock signals HH. This causes the packet processing block 120, routing control block 130, internal bus 140, external bus 500 and TxRx processing block 310 to each start up synchronized with the high-frequency clock signal HH. Similarly, when any of the three basis running modes (traffic basis, periodic basis, or line speed basis) are set in the settings file 17, the packet processing block 120, routing control block 130, internal bus 140, external bus 500, and TxRx processing block 310 are each started up with default values synchronized with the high-frequency clock signal HH.

On the other hand, if the low-power fixed running mode is set in the settings file 17, the system management block 11 controls the various clock generators CL1 through CL7 to produce and output low-frequency clock signal HL. This causes the packet processing block 120, routing control block 130, internal bus 140, external bus 500, and TxRx processing block 310 to startup synchronized with the clock signal HL. After this, in the operation of the network switching device 100, the operation mode of the respective constituent elements 120, 130, 140, 500, and 310 that are synchronized with the high-frequency clock signal HH shall be termed the "high-frequency clock operation," and the operation mode of the respective constituent elements 120, 130, 140, 500, and 310 that are synchronized with the low-frequency clock signal HL shall be termed the "low-frequency clock operation." As a general concept, speeding up the clock signals, which are a major factor in determining the operating speed of the various constituent elements, is one means by which to enable high speed packet processing; however, speeding up the clock signals makes the amount of power consumption increase due to the increased operating speed of the internal semiconductor integrated circuits. In the network switching device 1000 that uses the various constituent elements using this design method, speeding up the operation clock signals that are supplied to the various constituent elements increases the switching capacity by also increases the power consumption. Conversely, reducing the speed of the clock signal can reduce power consumption, but reduces the switching capacity.

When each constituent element of the network switching device 100 is started up and setup by the switch control block 11 and network switching device 1000 become a state wherein the packet switching process can be operated, then the packet switching process are started in the network switching device 1000 (Step S140), and the startup process is terminated.

Here, as described above, either of the two fixed running modes (the normal power or low power running mode) or any of the three basis running modes (the traffic basis, periodic basis, or line speed basis running mode) can be set in the settings file 17. The normal power fixed running mode is a running mode where, after running commences, the network switching device 1000 is always running at the high-frequency clock operation, and the low voltage fixed running mode is a running mode wherein, after running commences, the network switching device 1000 is always running at the low-frequency clock operation. On the other hand, the basis running modes are running modes wherein, after running commences, the operation of the network switching device 1000 switches automatically between high-frequency clock operation and low-frequency clock operation depending on the actual traffic load or the forecasted traffic load in the packet switching process.

Figure 6:
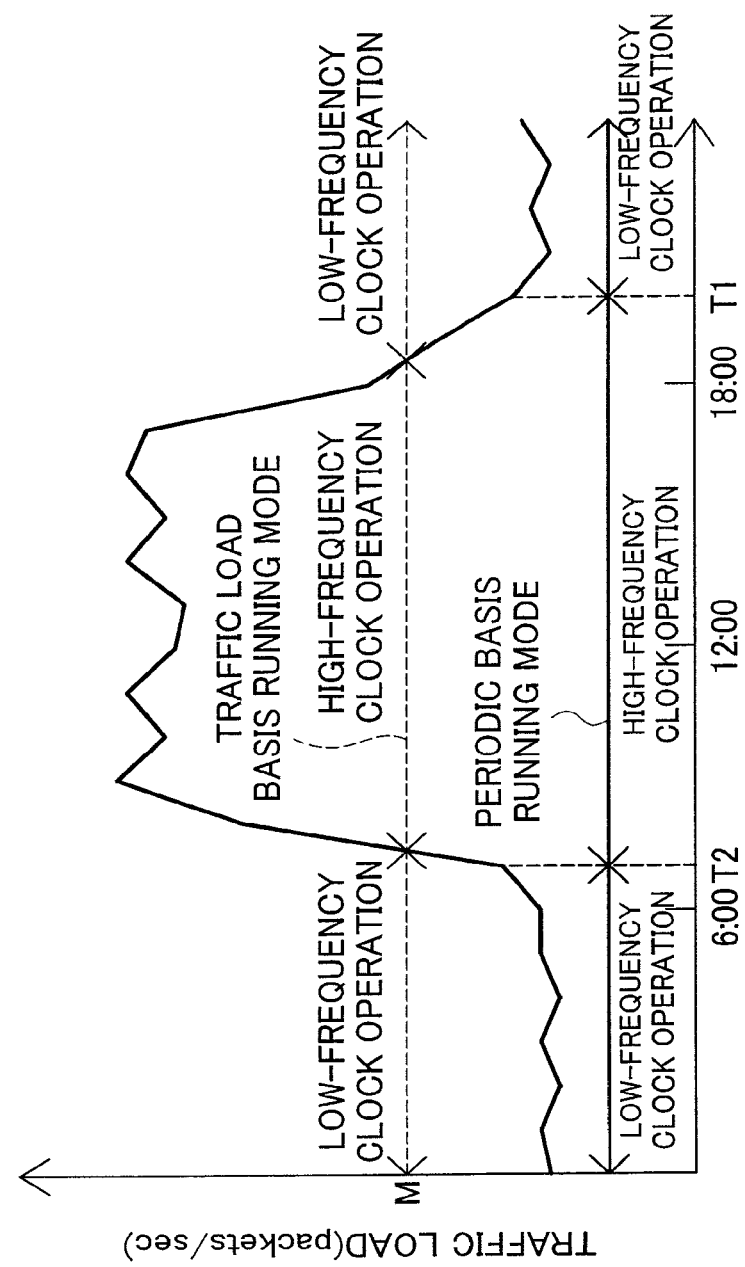
FIG. 6 shows an explanatory diagram for explaining the traffic load basis running mode and the periodic basis running mode.
Figure 7:
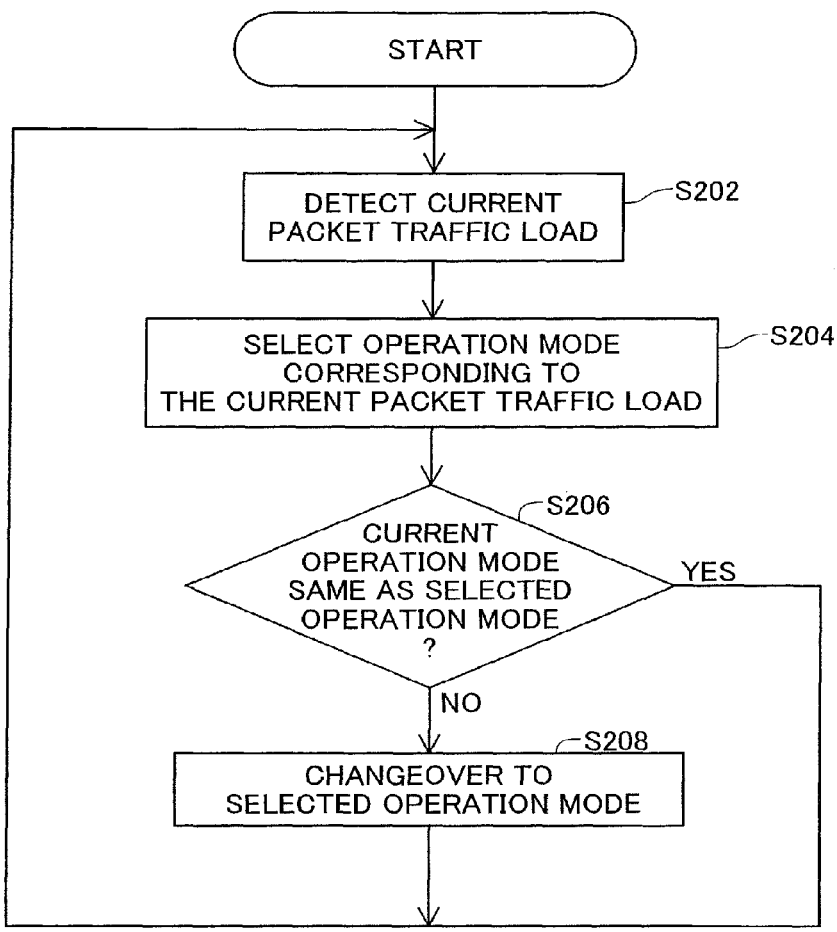
FIG. 7 shows a flowchart of the processing routine in a frequency control process in the traffic load basis running mode.
Figure 8:
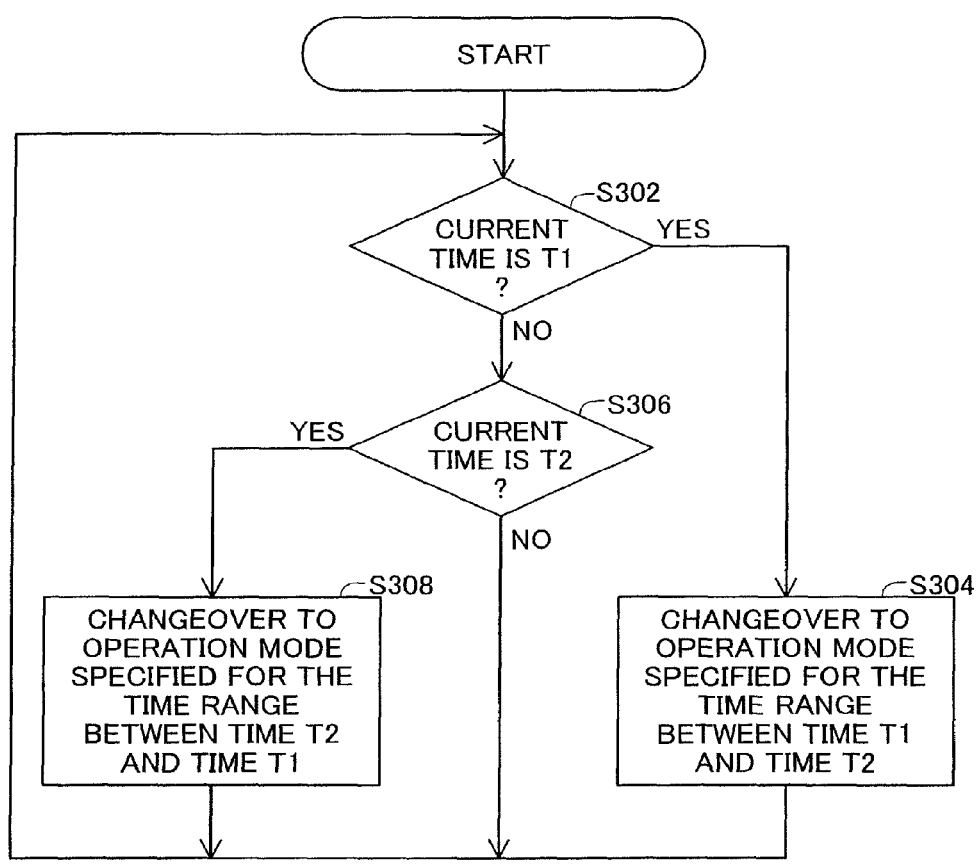
FIG. 8 shows a flowchart of a processing routine in a frequency control process in the periodic basis running mode.

The traffic load basis running mode and the periodic basis running mode will be explained in reference to FIG. 7 through FIG. 8. FIG. 6 shows an explanatory diagram for explaining the traffic load basis running mode and the periodic basis running mode. FIG. 7 shows a flow chart of the processing routine in the frequency control process in the traffic load basis running mode. FIG. 8 shows a flow chart of the processing routine in the frequency control process in the periodic basis running mode. In FIG. 6, the horizontal axis shows the time of day, and the vertical axis shows the traffic (the amount of packet flow) per unit time. The switching capacity required in the network switching device is not necessarily always a high value, but rather often may change with relative regularity depending on the network operating environment. For example, in the example illustrated in FIG. 6, there is a sudden increase in traffic beginning about 7:00 am, with consistently high traffic from 8:00 am to 6:00 pm. However, the traffic rapidly diminishes between 6:00 pm and 8:00 pm, with uniformly low traffic from 8:00 pm through 7:00 am the next day, at about ⅓ of the traffic found between 8:00 am and 6:00 pm.

When this type of change in traffic level is known to repeat regularly, the user may select, for example, the traffic load basis mode. As shown in FIG. 4, in the traffic load basis settings, if the per-unit-time traffic load (packets/sec) of the packets is less than M, then the corresponding operation are set to low-frequency clock operation, and if the per-unit-time traffic load is M or more, then the corresponding operation is set to high-frequency clock operation. The value of M may be set to an intermediate value between the average traffic load between 8:00 am and 6:00 pm and the average traffic load between 8:00 pm and 7:00 am the next morning. The frequency control process when the network switching device 1000 is in traffic load basis mode will be explained below referencing FIG. 7. When running of the network switching device 1000 starts, the traffic check module 15 of the system management block 11 detects the current packet traffic load (Step S202). The value used as the current packet traffic load is, for example, an average packet traffic load over the previous period of time of a specific length (for example, over the previous five minutes). When the current packet traffic load is detected, the frequency control module 16 of the system management block 11 references the traffic load basis settings in the settings file 17 shown in FIG. 4 and selects the operation mode (which is either low-frequency clock operation or high-frequency clock operation in the example shown in FIG. 4) corresponding to the current packet traffic load that has been detected (Step S204). The frequency control module 16 then determines whether or not the current operation mode of the network switching device 1000 is the same as the operation mode selected in Step S204 (Step S206). If the frequency control module 16 determines that the current operation mode is the same as the operation mode selected in Step 204 (Step S206: Yes), then processing returns to the process in Step 202, and the process described above is repeated.

On the other hand, if the frequency control module 16 determines that the current operation mode is not the same as the operation mode selected in Step S204 (Step S206: No), then the frequency control module 16 changes the operation mode of the network switching device 1000 to the operation mode selected in Step S204 (Step S208). As a specific example, with the traffic load basis settings shown in FIG. 4, the case will be described wherein the current packet traffic load is less than M in step S202, so the low-frequency clock operation is selected as the corresponding operation mode in Step S204. In this case, if the network switching device 1000 is already operating at the low-frequency clock operation, then the processing returns to Step 202, and if the network switching device 1000 is operating at high-frequency clock operation, then the operation mode will be switched over from high-frequency clock operation to low-frequency clock operation. The changeover of the operation mode from high-frequency clock operation to low-frequency clock operation is performed through restarting the various constituent elements 120, 130, 140, 500, and 310 to which the clock signals are provided by the clock generators CL1 through CL7, described above, and switching the clock signals generated by these clock generators CL1 through CL7 from high-frequency clock signals HH to low-frequency clock signals HL.

When performing the frequency control process as described above, in a time band wherein the traffic load is high and a large amount of switching capacity is required (from 8:00 am to 6:00 pm in the example in FIG. 6), the network switching device 1000 will operate a high-frequency clock operation. On the other hand, in a time band wherein the traffic load is low and there is not so much of a need for switching capacity (from 10:00 pm to 7:00 am the next morning in the example in FIG. 6), the network switching device 1000 will operate with low-frequency clock operation.

Moreover, with the network environment shown in FIG. 6, the user may select the periodic basis running mode. The frequency control process for running the network switching device 1000 in the periodic basis running mode will be described in reference to FIG. 8. When the operations begin, the frequency control module 16 of the device control unit 11 determines whether or not the current time has reached Time T1 recorded in the settings file 17 (Step S302). If the frequency control module 16 determines that the current time is T1 (Step S302: Yes), then the frequency control module 16 references the settings file 17 to change the operation of the network switching device 1000 to the operation mode defined in the time range from Time T1 through Time T2 (Step S304), and processing return to Step S302. In the example in FIG. 4, the operation mode that is specified for the time range from Time T1 to Time T2 is low-frequency clock operation, so in Step S304, the operation of the network switching device 1000 is changed from high-frequency clock operation to low-frequency clock operation.

If the frequency control module 16 determines that the current time is not T1 (Step S302: No), then the frequency control module 16 determines whether or not the current time is Time T2 written in the settings file 17 (Step S206). If the frequency control module 16 determines that the current time is T2 (Step S306: Yes), then the frequency control module 16 references the settings file 17 to change the operation of the network switching device 1000 to the operation mode specified in the time range from Time T2 through Time T1 (Step S308), and processing returns to Step S302. In the example illustrated in FIG. 4, the operation mode specified in the time range from Time T2 through Time T1 is high-frequency clock operation, and so in Step S308, the operation of the network switching device 1000 is switched over from low-frequency clock operation to high-frequency clock operation. If the frequency control module determines that the current time is not time T2 (Step S306: No), then processing returns to Step S302.

When the frequency control process is performed as described above, then, as shown in FIG. 6, the network switching device 1000 is operated at high-frequency clock operation during the time band wherein high switching capacity is required, and operates with low-frequency clock operation during the time band wherein such high switching capacity is not required, in the same way as for the traffic load basis running mode described above.

Figure 9:
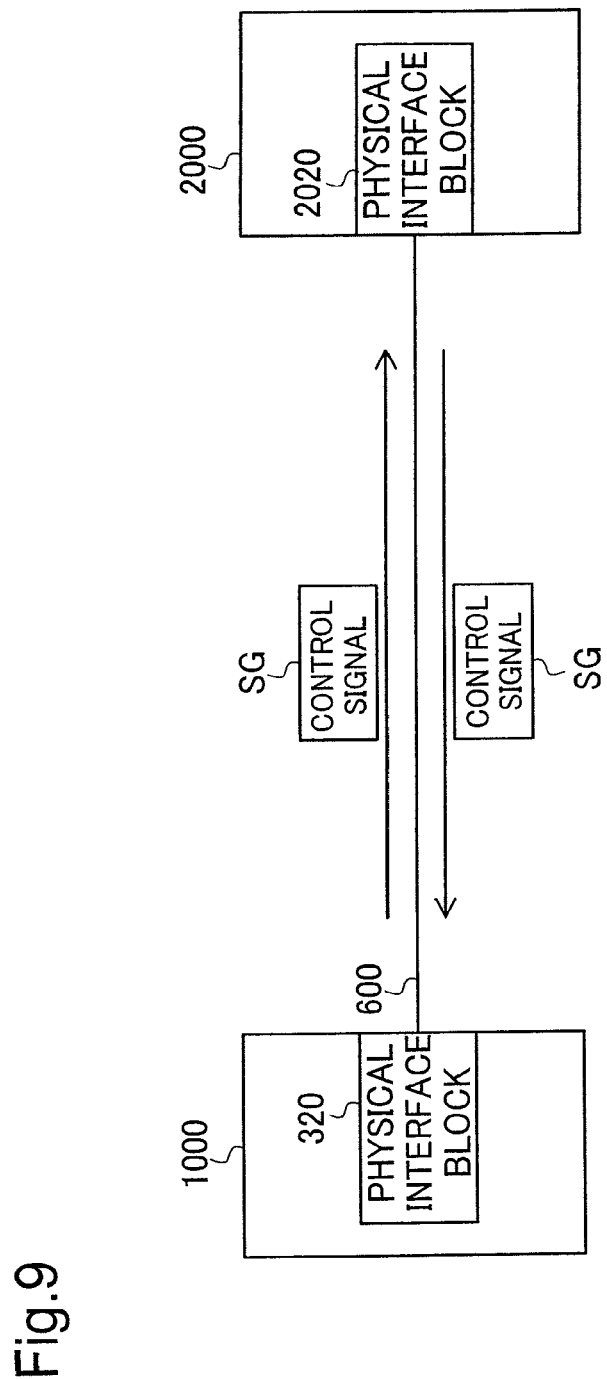
FIG. 9 shows a figure for explaining an auto negotiation function that automatically coordinates the line speeds/communications modes of a line between a pair of mutually-connected devices.
Figure 10:
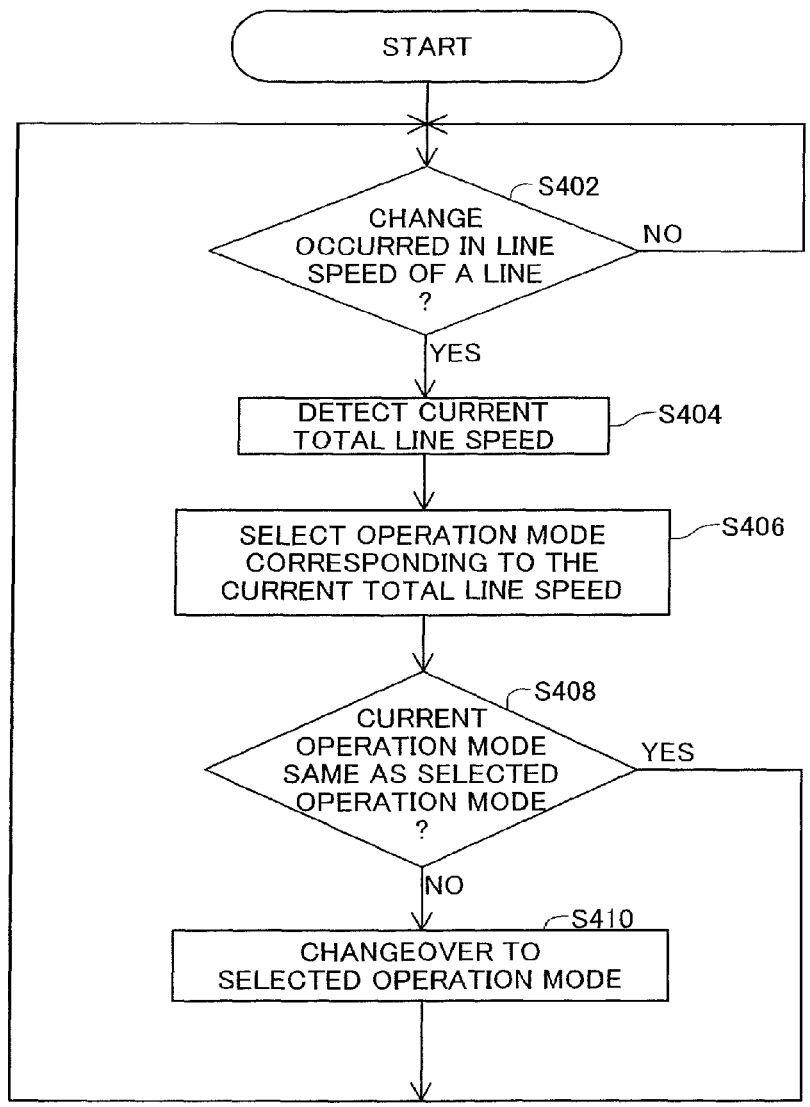
FIG. 10 shows a flowchart of a processing routine in a frequency control process in the line speed basis running mode.

Next FIG. 9 and FIG. 10 will be referenced in describing the line speed basis running mode. FIG. 9 shows a figure for explaining an auto negotiation function that automatically coordinates the line speeds/communications modes of a line between a pair of mutually-connected devices. FIG. 10 shows a flowchart of the processing routine in the frequency control process in the line speed basis running mode. The auto negotiation function is a function that coordinates automatically the line speeds/communications modes of a line between mutually-connected devices. In a communications method established by IEEE (the American Institute of Electrical and Electronics Engineers), there are interfaces having auto negotiation functions. Typical communications methods having auto negotiation include 10 BASE-T/100 BASE-X (specified in IEEE 802.3u), 1000 BASE-T (specified in IEEE 802.3ab), and 1000 BASE-X (specified in IEEE 802.3z). If the physical interface block 320 of the network switching device 1000 supports these communications methods, then, as shown in FIG. 9, when mutually connected with the physical interface block 2020 of an opposite device 2000 through a line 600, the physical interface block 320 is able to automatically adjust the line speeds/communications mode through checking the communications capabilities between the physical interface block 320 and the physical interface block 2020 of the opposite device 2000, connected through the line 600. Specifically, the mutual communications capability is confirmed through the exchange of control signals SG for communicating transfer capability data between the devices. Given this, the line speed/communications mode with the highest priority, of those modes supported by both devices, is set automatically. The line speed/communications mode can also be set manually. When the physical interface block 320 is provided with an auto negotiation function, then the packet traffic coming into the network switching device 1000 is determined by the line speed set in each of the physical interface blocks 320. For example, in a network switching device 1000 wherein ten lines 600 are connected, if the line speed in all of the lines 600 is set to 10 Mbps, then all of the packets can be processed if the network switching device 1000 has a switching capacity of 10 Mbps×10 lines=100 Mbps. Moreover, if the line speed for all of the lines 600 is 1000 Mbps, then it would be necessary for the network switching device 1000 to have a switching capacity of 1000 Mbps×10 lines=10 Gbps.

In this way, the switching capacity required in the network switching device 1000, depending on the results of the line speed negotiations by the physical interface blocks 320, will not necessarily always be the higher value. When the user selects the line speed basis running mode, then the user sets the line speed ranges and the corresponding operation modes in the setting file in consideration of the switching capacity that can be provided by the operation mode. In the example illustrated in FIG. 4, the operation mode corresponding to the case wherein the sum of the line speeds of all of the lines 600 (hereinafter termed the total line speed) is less than N is set to the low-frequency clock operation, but the operation mode corresponding to the case wherein the total line speed is N or greater is set to high-frequency clock operation.

The frequency control process when running the network switching device 1000 in the line speed basis running mode will be explained in reference to FIG. 10. When running of network switching device 1000 starts, the line speed check module 18 of the system management block 11 obtains the current line speeds of each of the lines 600 and determines whether or not there has been a change in the total line speed (Step 402). For example, if a new line 600 has been connected, then there will have been a change in the total line speed. When the line speed check module 18 determines that there has been no change in the total line speed (Step S402: No), then monitoring for the occurrence of a change in the total line speed is continued. If the line speed check module 18 determines that a change in the total line speed has occurred (Step S402: Yes), then the sum of the line speed of all of the lines 600 (the total line speed) is calculated/detected (Step S404). The frequency control module 16 of the system management block 11 references the settings file 17 to select the operation mode corresponding to the total line speed that has been detected (Step S406). The frequency control module 16 determines whether or not the current operation mode of the network switching device 1000 is the same as the operation mode selected in Step S406 (Step S408).

When the frequency control module 16 determines that the current operation mode is the same as the operation mode selected in Step S406 (Step S408: Yes), then processing returns to Step S402, and the processes described above are repeated. On the other hand, when the frequency control module 16 determines that the current operation mode is not the same as the operation mode selected in Step S406 (Step S408: No), then the operation mode of the network switching device 1000 is switched over to the operation mode selected in Step S406 (Step S410). As a specific example, an explanation will be given of the case wherein, with the line speed basis setting as shown in FIG. 4, the current total line speed in Step S404 is less than N, and low-frequency clock operation has been selected as the corresponding operation mode in Step S406. In this case, if the network switching device 1000 is already operating in the low-frequency clock operation, then processing returns to Step S402, but if the network switching device 1000 is operating in high-frequency clock operation, then the operation mode is switched from high-frequency clock operation to low-frequency clock operation. The switching of the operation mode is performed in the same manner as the switching of the operation mode for the traffic load basis mode described above.

When the frequency control process, described above, is performed, the network switching device 1000 operates with high-frequency clock operation when the sum of line speeds is high so that the state of network switching device 1000 is one wherein the high packet traffic load can be anticipated. On the other hand, when the sum of the line speeds is low, in a state wherein such high switching capacity will not be required, then the network switching device 1000 operates with low-frequency clock operation.

As can be understood from the description above, in the embodiment, the frequency control module 16 switches the operation mode of the network switching device 1000 by changing the frequency of the clock signal that is generated. That is, in this embodiment, the frequency control module 16 equivalent to the mode management block in the claims.

The network switching device 1000 in the embodiment, described above, change the frequency of the clock signal supplied to the various constituent elements depending on the user settings. This makes it possible to increase the performance of the network switching device 1000 by increasing the processing speed of the semiconductor integrated circuits (for example, the packet processing blocks 120 and the routing control blocks 130) by increasing the frequency, and makes it possible to reduce the power consumption of the network switching device 1000 by reducing the processing speed of the semiconductor integrated circuits by reducing the frequency. The result is that it is possible to control the amount of electrical power consumed by the network switching device 1000 while maintaining the necessary performance when required.

Moreover, because switching between high-frequency clock operation and low-frequency clock operation is performed automatically depending on the traffic load, such as in the periodic basis running mode, the traffic load basis running mode, and the line speed basis running mode, it is not only possible to maintain a large switching capacity when a large switching capacity is required, but also possible to reduce the consumption of electric power when a large switching capacity is not required. The result is the ability to control the overall consumption of electric power without sacrificing switching performance.

Moreover, the user is able to record, in advance, in the settings file 17, the interface boards 300 that will not be used. At startup, the system management block 11 references the settings file 17 regarding the unused interface boards 300 that have been recorded in the settings file 17, to selectively stop the supply of power thereto. The result is that it is possible to further reduce the amount of electrical power consumed.

Moreover, the user is able to record, in advance, in the settings file 17, the physical interface blocks 320 that are unused. If there is an unused physical interface block 320 recorded in the settings file 17, then the system management block 11 does not supply electrical power from the on-board power supply 360 to the physical interface block 320 that is recorded in the settings file 17, or uses a known technology to set a state of the physical interface block 320 that is recorded in the settings file 17 wherein power consumption is reduced. The result is an even greater ability to reduce the consumption of electrical power.

Operation Mode Management Process

FIG. 11 through FIG. 15 are schematic diagrams illustrating in greater detail the operation mode management process in this embodiment. Each of FIG. 11 through FIG. 15 illustrates the operation state of the network switching device 1000. In each of these figures, one interface board 300 is illustrated as a representative example of all of the plurality of interface boards 300.

Note that, as shown in FIG. 1, the network switching device 1000 has two control boards 10 and two switching boards 100. Given this, in the explanation below, a code identifying the individual is added to the ends of the codes indicating the control boards 10 and the switching boards 100, as well as to the ends of the codes indicating the various constituent elements and the various types of data. That is, the code "a" is added to the ends of the codes identifying those items pertaining to the "first" board, and the code "b" is added to the ends of the codes identifying those items pertaining to the "second" board. Moreover, when it is not necessary to differentiate between the individual control boards, or the individual switching boards, or the like, the codes for individual identification, which are otherwise added to the ends of the codes, are omitted.

Figure 11:
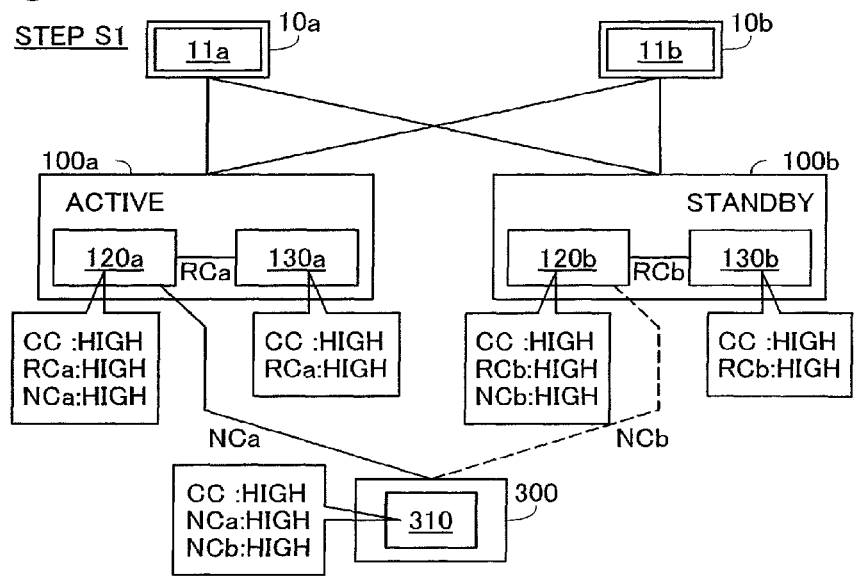
FIGS. 11-15 are schematic diagrams illustrating in greater detail the operation mode management process.

In the first embodiment, one of the two switching boards 100a and 100b is used as the "active board" and the other is used as the "standby board." In the example shown in FIG. 11, the first switching board 11a functions as the active board and the second switching board 100b functions as the standby board. The same is true for the control boards 10. Note that in the explanation below, it is assumed that the first control board 10a is always functioning, and the second control board 10b is not used. Note also that in the explanation below, the switching board 100 that is functioning as the active board may also be referred to as simply the "active board 100." The same is true for the "standby board."

Under normal conditions, only the active board 100a performs the packet switching process (or, more specifically, performs the process of determining the lines to which to send the packets, also termed "switching-determination process" below), where the standby board 100b does not perform the switching-determination process. The standby board 100b continues the switching-determination process instead of the active board 100a when a problem occurs with the active board 100a. In this way, in the first embodiment, there is redundancy in the switching boards 100, making it possible to increase the reliability when it comes to problems with the switching boards 100. Moreover, as will be described below, the standby board 100b can also be used in changeover processing of the operation modes in the network switching device 1000.

In order to achieve continuity in the switching-determination process using the standby board 100b, the control board 10 (the system management block 11) reflects to the standby board 100b any changes in the forwarding table 134 (FIG. 3) or the IP address table 135 in the active board 100a (where these tables 134 and 135 shall be termed, together, the "switching information 134 and 135"). If there is a change in the switching information 134 or 135 in the active board 100a, then the control board 10 changes the switching information 134 or 135 in the standby board 100b in the same way as well. This type of change in switching information can be performed, for example, by user instructions. Moreover, the control board 10 (system management block 11) may update the switching information 134 and 135 automatically through the use of the RIP or OSPF commands.

Changes in the operation statuses when there is a change from the "normal mode" to the "low-power mode" for the operation mode in the network switching device 100 are illustrated in FIG. 11 through FIG. 15. The operation statuses in the network switching device 1000 change sequentially from FIG. 11 through FIG. 15. In the first step S1, shown in FIG. 11, the network switching device 1000 is operating in "normal mode." In this "normal mode," the respective switching boards 100a and 100b, and the respective interface boards 300 are each operating in "normal mode."

In the present embodiment, the "normal mode" of a switching board 100 means that each of the clocks related to that switching board 100 (that is the core clocks CC for each of the circuits 120 and 130, the bus clock RC for the internal bus 140, and the bus clock NC for the external bus 500 between the packet processing block 120 and the TxRx processing block 310) are each in the "high" state. Conversely, the "low-power mode" for the switching board 100 means a state wherein each of these clocks is in the "low" state. Moreover, the "normal mode" for the interface board 300 means a state wherein the core clock CC of the TxRx processing block 310 is "high." Conversely, the "low-power mode" for an interface board 300 means a state wherein the core clock CC for the TxRx processing block 310 is "low." Note that although a clock signal from the interface board 300 side is also supplied to the external bus 500 (FIG. 3: Clock generator CL6), the frequency of this clock signal is changed depending on the switching over of the operation mode of the switching board 100 (described below).

In the next step S2 (FIG. 12), the first system management block 11a (the frequency control module 16 (FIG. 2)) switches the operation mode of the second switching board 100b from the "normal mode" to the "low-power mode." The first system management block 11a either temporarily turns the power to the standby board 100b off and then on again, or applies a reset thereto, to restart the standby board 100b. After this, the various clock generators CL1 through CL5 (FIG. 3) of the standby board 100b are controlled in the procedure described in Step S130 of FIG. 5 to generate and output the low-frequency clock signal HL. This causes the core clocks CC of the respective circuits 120b and 130b, the internal bus clock RCb and the external bus clock NCb for the standby board 100b to each change from "high" to "low," causing the standby board 100b to perform processing synchronized with the low-frequency clock signals HL after the change. Note that the switching-determination process is performed by an active board 100a that is not the standby board 100b, so the switching-determination processing continues, without being affected by the restarting of the standby board 100b.

Note that "resetting (power-on resetting)" means a process of resetting the operations of the electronic circuit without turning off the power to the electronic circuit. Resetting initializes the operation in the electronic circuit. For example, resetting sets the values that are stored in the memory in the electronic circuit (for example, the ASIC registers) to specific values. Note also that this resetting can be performed, using a variety of methods. For example, the resetting of the electronic circuit may be performed by the first system management block 11a applying a specific reset signal to the electronic circuit. This type of reset is often used when changing the operation modes of electronic circuits. Given this, preferably a reset is performed following setting a new operation mode. Doing so causes the initialization of the operation of the electronic circuit to be performed in the operation mode that has been set, thus making it possible to prevent any instability in the processing of the electronic circuit that might arise from the change in the operation mode. In the present embodiment, the standby board 100b may be subjected to a reset after there has been a change in each of the clocks CC, RCb, and NCb. Note that, conversely, the new operation mode may be set after the reset. Note also that the explanation above of changing the operating mode and performing the reset is the same also for other electronic circuits (such as the other switching board 100 and the interface boards 300).

After the standby board 100b is restarted, the first system management block 11a copies the switching information 134 and 135 from the active board 100a to the standby board 100b. This causes the standby board 100b to store the same switching information as the active board 100a. As a result, the standby board 100b is capable of executing the same switching-determination processes as the active board 100a. Note that the copying of the switching information 134 and 135 is performed through the control bus 400 (FIG. 1). Moreover, in this way, the copying of the switching information is performed after the restarting of the standby board 100b has been completed, or in other words, after the changing of the operation mode of the standby board 100b has been completed. Consequently, even if the memories 132 and 133 (FIG. 3) have been cleared as a result of the change in the operation mode, the standby board 100b can store the appropriate switching information.

Moreover, the first system management block 11a controls the clock generator CL6 (FIG. 3) of the interface board 300 to cause the generating and outputting of the low-frequency clock signal HL. This causes the external bus clock NCb of the external bus 500 in the interface board 300 to change from "high" to "low" as well. This changeover of the external bus clock NCb is performed without restarting the TxRx processing block 310. For example, the first system management block 11a resets the interface circuitry (for example, a so-called SERDES (serializer/deserializer) circuitry, not shown) that perform communications with the standby board 100b in the TxRx processing block 310. In addition, the first system management block 11a switches the external bus clock NCb (the clock from the clock generator CL6 (FIG. 3)) during the reset. Note that the packet switching process, or, more specifically, the packet sending and receiving process (hereinafter termed the "transfer process") is performed by an interface circuitry (not shown) for the active board 100a, which is different from the interface block that is being reset, and thus the transfer process continues, unaffected by the changeover of the external bus clock NCb.

In the next step S3 (FIG. 13), the first system management block 11a switches the current active board 100a with the current standby board 100b. Specifically, the first system management block 11a sends, to the TxRx processing block 310, a command to send packets to the second packet processing block 120b instead of to the first packet processing block 120a. In response to this command, the TxRx processing block 310 begins to send packets to the new active board 100b. As a result, the packet switching process by the second switching board 100b and the interface board 300 is started. On the other hand, because packets are no longer sent to the first switching board 100a, the packet switching process (the switching-determination process) is no longer performed by the first switching board 100a.

Figure 12:
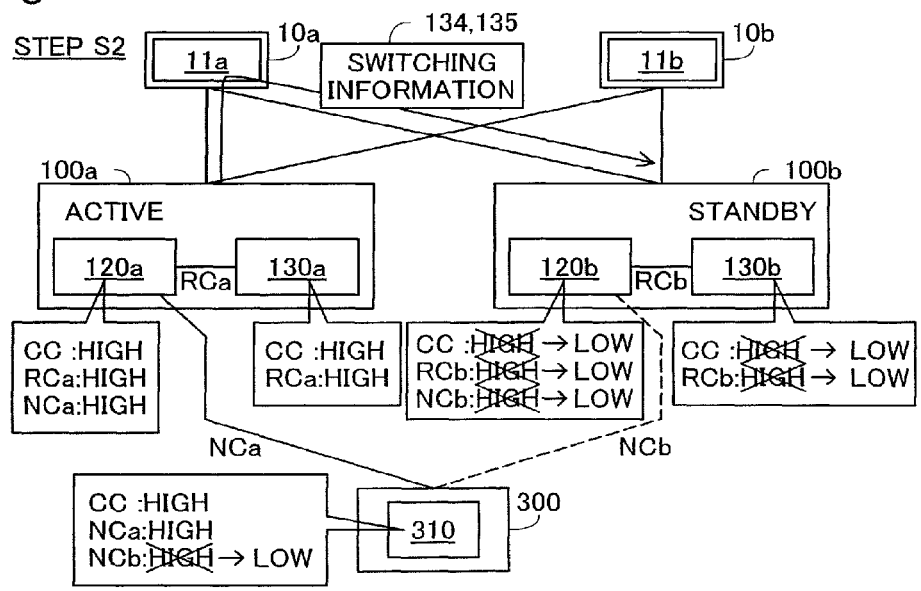
Figure 13:
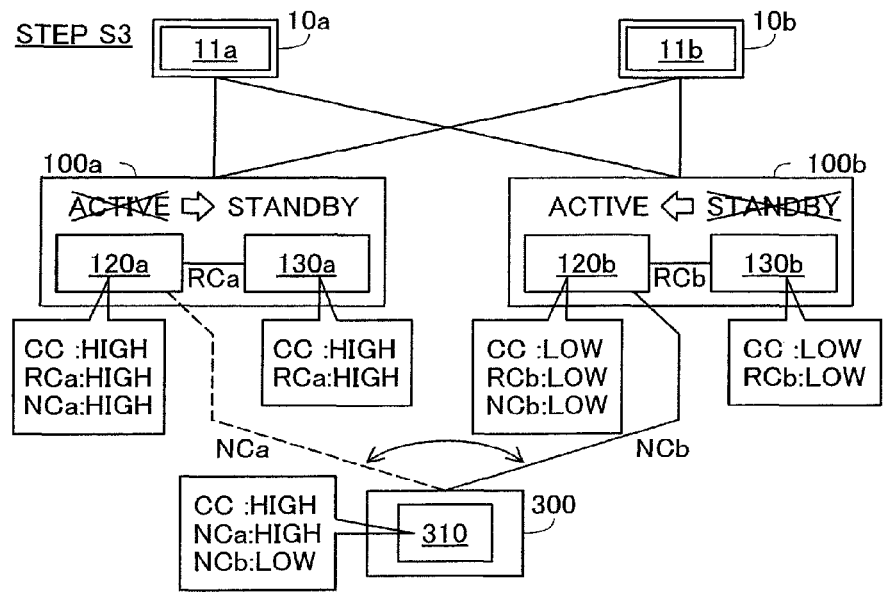
Figure 14:
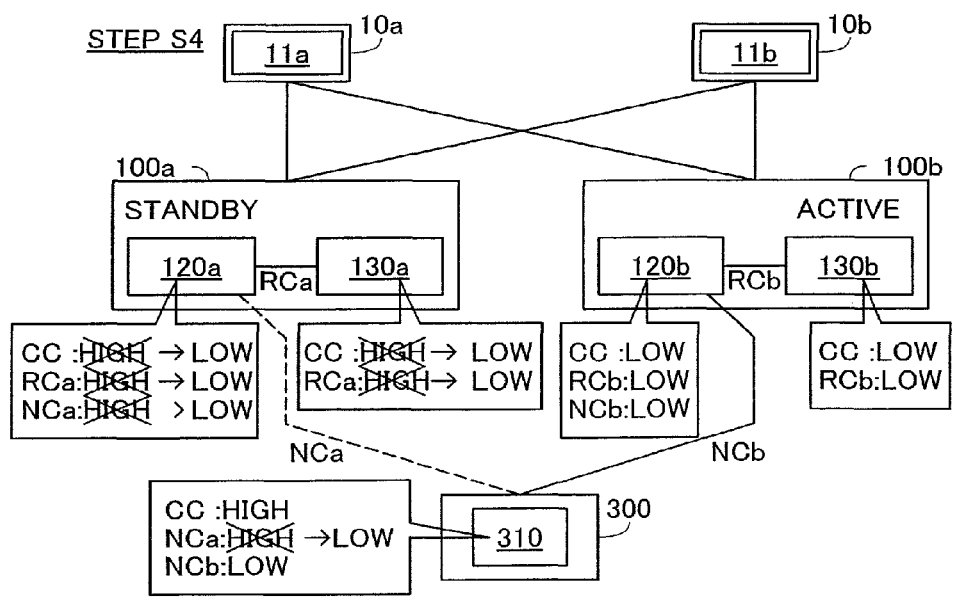

As described above, the second switching board 100b has the same data as the switching information in the first switching board 100a (Step S2: FIG. 12). Consequently, the second switching board 100b is able to start a process that is the same as the switching-determination process that had been being performed by the first switching board 100a. Moreover, the switching-determination process by the second switching board 100b (the new active board) is started after the conclusion of the copying of the switching information, thus making it possible to prevent that interruption of the switching-determination process which is caused by the swapping (switching over) of these switching boards 100.

In the next step S4 (FIG. 14), the first system management block 11a changes the operation mode of the first switching board 100a from the "normal mode" to the "low-power mode." This changeover process is performed in the same manner as the changeover process for the operating mode of the second switching board 100b, explained using FIG. 12. The reason why, in this way, the operation mode of the new standby board (the switching board 100 that is in the standby state) is changed to the same mode as the operation mode of the new active board (the switching board 100 that is in the operating state) is that if a problem were to occur in the active board, this makes it possible to use the standby board operating in the same operation mode as the active board.

In the next step S5 (FIG. 15), the first system management block 11a changes the operation mode of the interface board 300 from the "normal mode" to the "low-power mode." The first system management block 11a restarts the interface board 300 through either turning off and then back on the power supply to the interface board 300, or performing a reset on the interface board 300. After this, the clock generator CL7 (FIG. 3) of the interface board 300 is controlled according to the procedure explained in Step S130 of FIG. 5 to generate and output the low-frequency clock signal HL. This causes the core clock CC of the TxRx processing block 310 to change over from "high" to "low," causing the TxRx processing block 310 to perform processing synchronized with the low-frequency clock signal after the changeover. During this mode changing, the transfer process through the interface board 300 during the mode changing is interrupted.

The processes described above causes the operation mode of the network switching device 1000 to be switched from the "normal mode" to the "low-power mode." Conversely, the process of switching over the operation mode of the network switching device 100 from the "low-power mode" to the "normal mode" is performed through the opposite sequence.

As described above, in the first embodiment, the standby board and the active board are swapped after completion of the changeover of the operating mode of the standby board, and thus it is possible to changeover the operation mode of the switching board 100 that is used for executing the switching-determination process without switching over the operation mode of the switching board 100 that is in execution of the switching-determination process. As a result, it is possible to control the consumption of electric power while preventing the interruption time of the packet switching process from becoming excessively long. Moreover, in the present embodiment, the switching information is copied from the active board to the standby board immediately prior to the swapping of the standby board and the active board. Consequently, it is possible for the new active board to execute the same switching-determination processes as the old active board immediately when the standby board becomes the new active board. Moreover, because the standby board is used in switching over the operation mode of the switching board 100, the standby board can still be used effectively even when there is no problem with the active board.

Moreover, in the first embodiment, the operation mode of the new standby board is changed to be the same mode as the operation mode of the new active board. Consequently, even if there were a problem with the new active board, it would be possible to continue the switching-determination process in the same operation mode by using the new standby board. As a result, it is possible to prevent an inappropriate drop in packet switching processing capability. This also makes it possible to prevent inappropriately high levels of power consumption in the network switching device 1000.

Note that the mode management process in the first embodiment can be used also in the event of the operation mode changeover that occurs due to any of the running modes specified in the settings file 17.

B. Second Embodiment

FIG. 16 through FIG. 20 are schematic diagrams illustrating an overview of a operation mode management process in a network switching device 1001 according to a second embodiment. The structure of this network switching device 1001 is the same as the structure of the network switching device 1000 according to the first embodiment, described above, with the addition of a third switching board 100c. This third switching board 100c, as with the other boards 100a and 100b, is connected to a control board 10 and an interface board 300. Moreover, the structure of the third switching board 100c is the same as the other boards 100a and 100b. Note that in FIG. 16 through FIG. 20, only the three switching boards 100a through 100c, a representative interface board 300 and the first control board 10a are shown as the constituent elements of the network switching device 1001, and the other constituent elements thereof are omitted in the drawings. Moreover, in the explanation below, the code "c" is added to the ends of the codes for the elements pertaining to the "third" switching board 100c.

Figure 16:
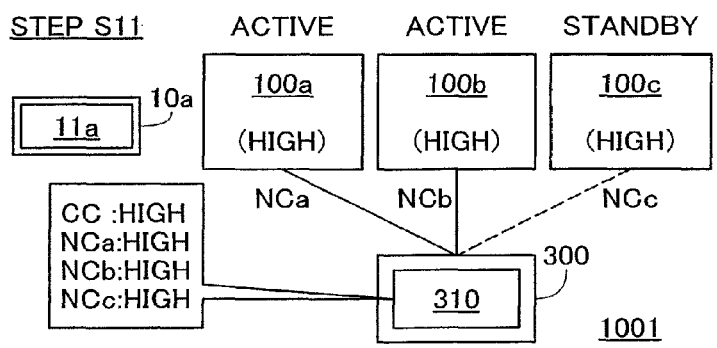
FIGS. 16-20 are schematic diagrams illustrating an overview of a operation mode management process.
Figure 17:
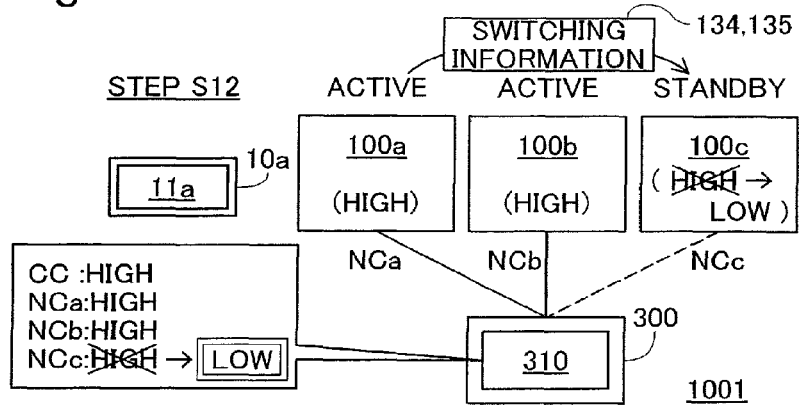
Figure 18:
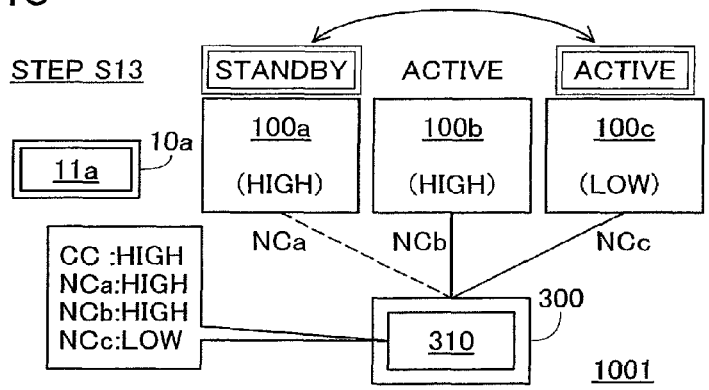
Figure 19:
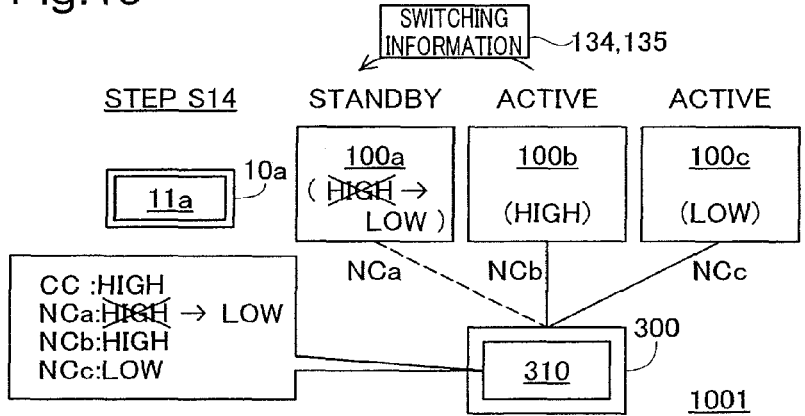
Figure 20:
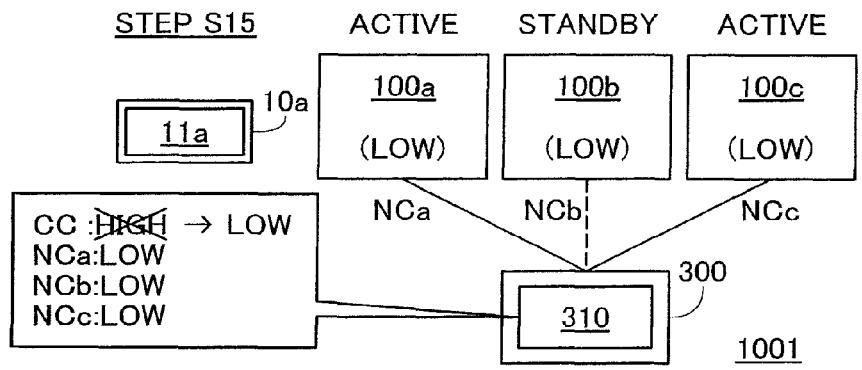

In the second embodiment, two of the three switching board 100a through 100c are used as the "active boards," where the remaining switching board is used as a "standby board." In the example illustrated in FIG. 16, the first switching board 100a and the second switching board 100b function as active boards, and the third switching board 100c functions as a standby board. The switching-determination process is distributed between these two active boards. For example, the two active boards 100a and 100b are alternately used by the interface board 300 when a plurality of packets are received by the interface board 300. The reason for distributing the switching-determination processes between the two active boards is to increase the speed of the switching-determination process, or in other words, to increase the speed of the packet switching process.

FIG. 16 through FIG. 20 illustrate the changing of the operation statuses when the operation mode in the network switching device 1001 is switched over from the "normal mode" to the "low speed mode." The first system management block 11a (the frequency control module 16 (FIG. 2)), as with the first embodiment, switches over the operation mode of the network switching device 1001 according to the settings that are stored in a settings file 17 (FIG. 4).

In the first step S11, shown in FIG. 16, the network switching device 1001 is operating in the "normal mode". In the "normal mode," each of the switching boards 100a through 100c and the interface board 300 is operating in the "normal mode."

In the next step S12 (FIG. 17), the operation mode of the standby board 100c is switched from the "normal mode" to the "low-power mode." At this time, the switching information 134 and 135 of one of the active boards (the active board 100a) is copied to the standby board 100c. Furthermore, the external bus clock NCc for the standby board 100c in the interface board 300 is also switched over from "high" to "low." These processes are performed in the same manner as the processes in FIG. 12.

In the next step S13 (FIG. 18), the standby board 100c is swapped with the one of the active boards (the active board 100a). This process is performed in the same manner as the process in FIG. 13. Note that any of the current active boards can be used to be swapped. For example, a board that has been selected in advance may be used.

In the next step S14 (FIG. 19), the operation mode of the new standby board 100a is switched from the "normal mode" to the "low-power mode." At this time, the switching information 134 and 135 of the remaining active board 100b, which is processing in the normal mode, is copied to the new standby board 100a. Furthermore, the external bus clock NCa for the new standby board 100a in the interface board 300 is also switched over from "high" to "low." These processes are performed in the same way as the processes in FIG. 12.

In the below, the operating mode of the remaining active board 100b is also similarly switched over from the "normal mode" to the "low-power mode" by swapping this active board 100b with the new standby board 100a. In this way, it is possible to switch the operation modes of all the switching boards 100a through 100c from the "normal mode" to the "low-power mode." Note that all of the changeovers are performed using standby boards, so the packet switching process continues without interruption.

Figure 15:
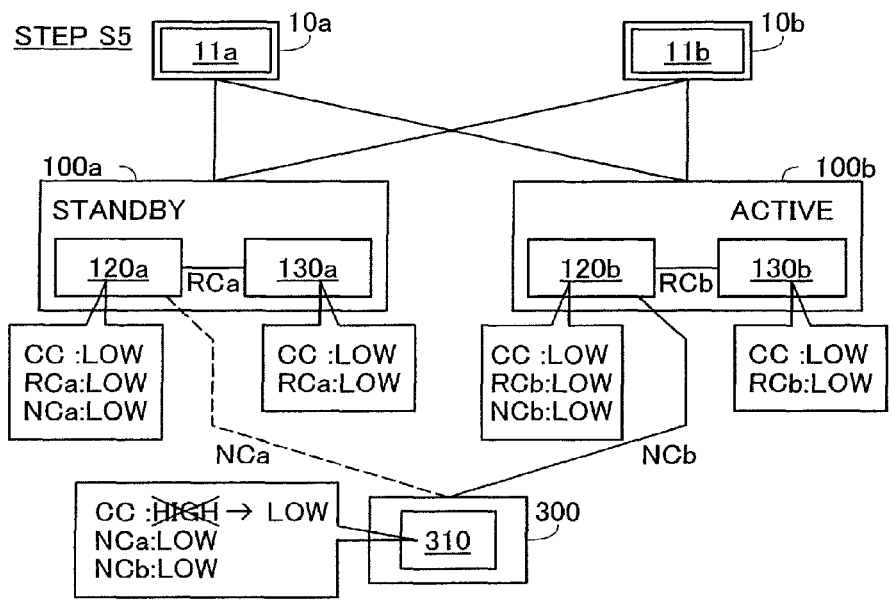

In the next step S15 (FIG. 20), the operating mode of the interface board 300 is switched from the "normal mode" to the "low-power mode." This process is performed in the same manner as the process in FIG. 15.

The operation mode of the network switching device 1001 is switched over from the "normal mode" to the "low-power mode" through the processes described above. Conversely, the process for switching the operation mode of the network switching device 1001 from the "low-power mode" to the "normal mode" is performed in the opposite sequence of that which is described above.

As described above, in the second embodiment, the series of processes for swapping the standby board and the active board after the changeover of the operation mode of the standby board has been completed is performed repetitively. Consequently, even when the operation mode is switched over in three of the switching boards 100a through 100c, it is still possible to prevent the interruption time of the packet switching process caused by the switching over of the operation mode from becoming excessively long.

Note that the total number of the active boards is not limited to one or two, but rather any number of active boards, even three or more, may be employed. Moreover, the number of standby boards is not limited to one, but rather any number of standby boards, even two or more, may be employed. In any case, at least one of the plurality of switching boards 100 may be used as a standby switching block (a standby board 100 in the present embodiment) that is started in the same operation mode as an active board 100 without performing the switching-determination process unless there is a problem. Doing this makes it possible to continue the switching-determination process using the standby switching block, using the same operation mode, when a problem occurs in an active board 100. Furthermore, when the operation mode of a switching board 100 that is used for executing the switching-determination process is switched over, preferably that series of processes described above is performed repetitively, in which the standby switching block (the standby board 100) and an active board 100 are swapped. Doing so makes it possible to change over the operation mode of the switching board 100 that is used for executing the switching-determination process, without switching over the operation mode of a switching board 100 that is in execution of the switching-determination process. As a result, it is possible to change over the operation mode of a plurality of switching boards 100 while preventing the interruption time of the packet switching process from becoming excessively long.

Note that the mode management process in the second embodiment can be used also in the event of the operation mode changeover that occurs due to any of the running modes specified in the settings file 17.

C. Third Embodiment

FIG. 21 through FIG. 25 are schematic diagrams illustrating an overview of the operation mode management process in a network switching device 1002 according to a third embodiment. The difference with the network switching device 1001 according to the second embodiment, shown in FIG. 16 to FIG. 20 is the point that one of the three switching boards 100a through 100c is used as a "spare board." In this embodiment, the total number of the active board is one, and the total number of the standby board is one. In the example illustrated in FIG. 21, the first switching board 100a functions as the active board, the second switching board 100b functions as the standby board, and the third switching board 100c is used as the spare board. The "spare board" preferably has the power supply thereto turned off under normal conditions. Moreover, the operation mode of the spare board may be set to a operation mode with less power consumption than that of the "standby board." The "spare board" is provided with power and used as a new standby board when a problem has occurred in at least one of the "active board" or the "standby board." Moreover, in the present embodiment, as will be described below, the spare board is used also in the changeover process for the operation mode of the network switching device 1002. Note that the structure of the network switching device 1002 is the same as the structure of the network switching device 1001 according to the second embodiment described above.

FIG. 21 through FIG. 25 illustrate the changes in the operation statuses when the operation mode of the network switching device 1002 is switched over from the "normal mode" to the "low-power mode." The operation statuses of the network switching device 1002 change in the sequence of FIG. 21 through FIG. 25. The first system management block 11a (the frequency control module 16 (FIG. 2)) switches over the operation mode of the network switching device 1002 according to the settings that are stored in the settings file 17 (FIG. 4) in the same manner as in the first embodiment.

Figure 21:
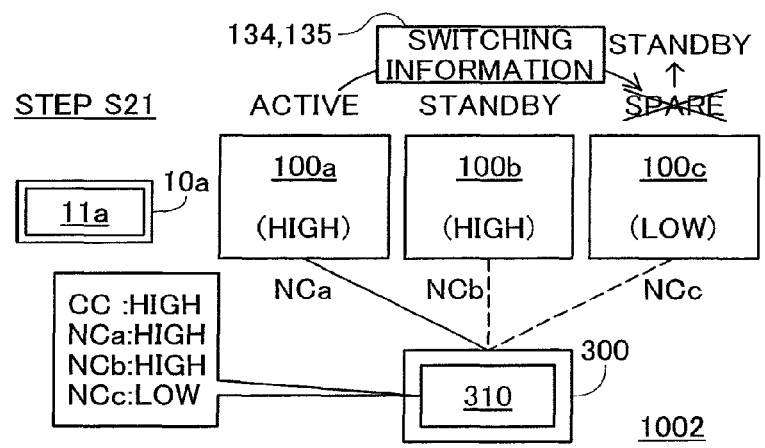
FIGS. 21-25 are schematic diagrams illustrating an overview of the operation mode management process.
Figure 22:
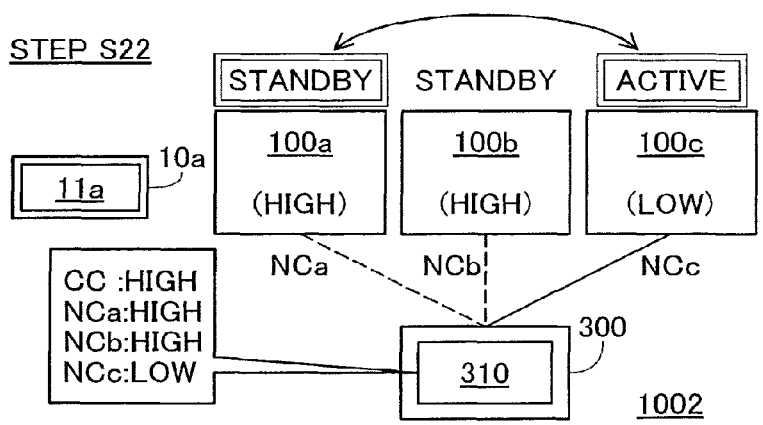
Figure 23:
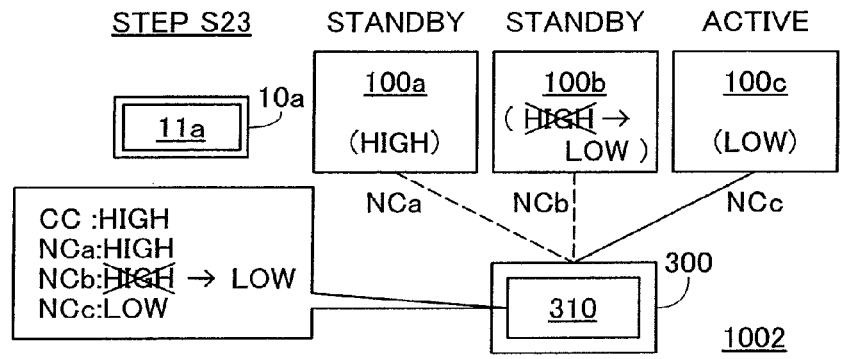
Figure 24:
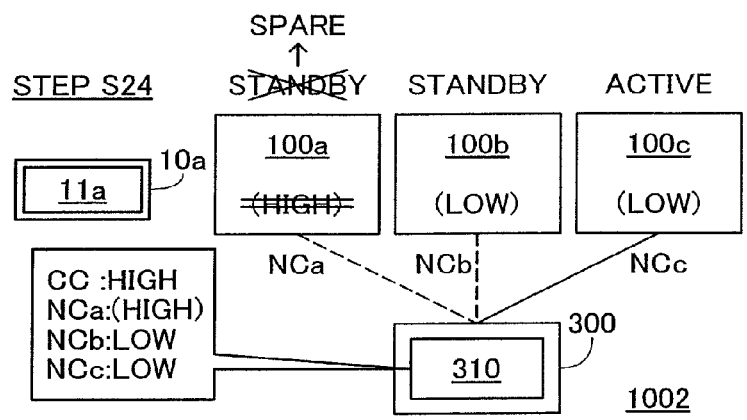
Figure 25:
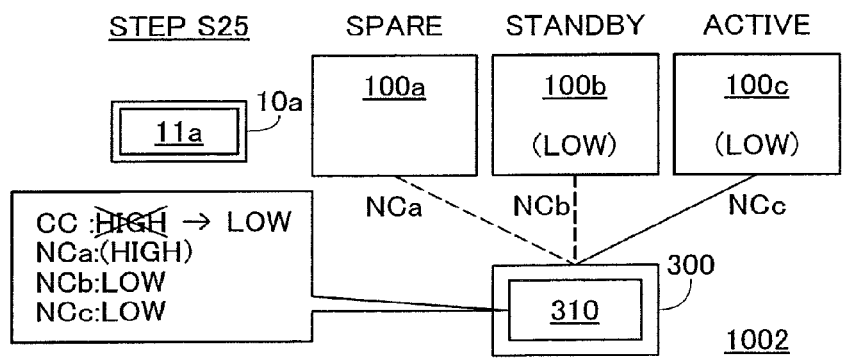

In the first step S21 shown in FIG. 21, the network switching device 1002 performs processing in the "normal mode." In this "normal mode," each of the active board 100a, the standby board 100b, and the interface board 300 is operating in the "normal mode." Moreover, in the present embodiment, the power to the spare board 100c is turned off under normal circumstances. Given this, in Step S21, the first system management block 11a turns on the power supply to the spare board 100c in order to perform the operation mode management process. At this time, the operation mode of the spare board 1000c is set to the "low-power mode." Moreover, the first system management block 11a copies the switching information 134 and 135 of the active board 100a to the spare board 100c. Moreover, if the external bus clock NCc for the spare board 100c in the interface board 300 is "high," then the first system management block 11a switches this external bus clock NCc over to "low." These processes are executed in the same way as the processes in FIG. 12. Moreover, these processes cause the spare board 100c to function as the new standby board. As a result, the status of the network switching device 1002 becomes a status wherein one active board 100a and two standby board 100b and 100c are operating. Note that, the operation mode of the new standby board 100c is the "low-power mode," which is different from the operation modes of the other boards 100a and 100b (which are operating in the normal mode).

In the next step S22, (FIG. 22), the new standby board 100c and the active board 100a are swapped. This process is performed in the same way as the process in FIG. 13.

In the next step S23 (FIG. 23), the operating mode of the old standby board 100b is switched over from the "normal mode" to the "low-power mode." Moreover, the external bus clock NCb for the old standby board 100b in the interface board 300 is also switched over from "high" to "low." These processes are performed in the same way as the process in FIG. 12. Note that in this step S23, the switching-determination process can be performed by the new standby board 100a instead of the new active board 100c, even in the middle of the process of switching over the operation mode of the old standby board 100b.

In the next step, S24 (FIG. 24), the first system management block 11a uses the new standby board 100a as a new spare board. Specifically, the first system management block 11a switches off the power to the new spare board 100a. At this time, the external bus clock NCa for the new spare board 100a may be maintained unchanged at "high," or, instead may be switched over from "high" to "low." If the external bus clock NCa is maintained at "high," then when next the operation mode of the network switching device 1002 is switched over to the normal mode, there will be no need to change over the external bus clock NCa, making it possible to change over to the normal mode rapidly. Moreover, if the external bus clock NCa is switched over to "low," then it will be possible to suppress the power consumption in the interface board 300. Moreover, conversely the provision of the external bus clock NCa to the interface circuitry (not shown) within the TxRx processing block 310 may be turned off for the new spare board 100a.

In the next step 25 (FIG. 25), the operation mode of the interface board 300 is switched over from the "normal mode" to the "low-power mode." This process is performed in the same way as the process in FIG. 15.

The operation mode of the network switching device 1002 is switched over from the "normal mode" to the "low-power mode" through the process described above. Conversely, the process for switching over the operation mode of the network switching device 1002 from the "low-power mode" to the "normal mode" is performed following the opposite procedure.

As described above, in the third embodiment, the series of processes for swapping the spare board and another switching board 100 (including the active board and the standby board) after the setting of the operation mode of the spare board has been completed. Consequently, even when the operation modes of each of the switching boards 100a through 100c are to be switched over, it is still possible to prevent any excessively long interruptions in the packet switching process caused by switching over the operation modes.

Moreover, in the third embodiment, a spare board is used in addition to the active board and the standby board in order to change over the operating mode of the network switching device 1002, making it possible to insure the active board and the standby board even when the spare board is being restarted. Consequently, even when a problem occurs in the active switching board 100 while the operation mode management (changing) is in process, it is still possible to prevent a long stop in the packet switching process, by using the standby board 100.

Note that even though in the third embodiment the power supply to the spare board 100 was turned off during normal operations, conversely, the power supply to the spare board 100 may be turned on during normal operations. More specifically, two of the three boards, of the switching boards 100a, 100b and 100c may be used as standby boards. Doing so makes it possible to further increase the reliability to problems of the switching boards 100.

Typically, at least two of the plurality of switching boards 100 are preferably used as switching boards 100 for replacements that are not used in the switching-determination process under normal circumstances. Moreover, at least one replacement switching board is preferably started up in the same operation mode as the active switching boards 100 which are in operation (that replacement switching board corresponds to the "standby switching block" in the claims). Here, as in the third embodiment, that series of processes may be executed repetitively by which the operation modes of the replacement switching boards 100 (the spare board in the example in FIG. 21 through FIG. 25) other than the standby switching block is switched over (set), and after the changeover (setting), the replacement switching board 100 for which the changeover has been completed is swapped with another switching board 100. Doing so makes it possible for the standby switching block to perform the switching-determination process instead of the active board 100 even in the middle of switching over of the operation mode. As a result, it is possible to increase the reliability in terms of a problem in the switching board 100. Here the operation mode of the replacement switching boards 100 aside from the standby switching block is preferably set to an operating mode with less power consumption than that of the standby switching block. Doing so makes it possible to reduce the power consumption of the network switching device. Note that, any given operation mode may be employed in which the power consumption is less than that of the standby switching block, as the operation mode of the replacement switching boards 100 aside from the standby switching block. For example, a "stop mode" wherein the power supply is turned off may be employed.

Note that in the third embodiment, a sequence of processes was used wherein after the spare board 100c was set to the "low-power mode," the new standby board 100c was swapped with the active board 100a, the old standby board 100b was switched over to the "low-power mode," and the new standby board 100a was used as the new spare board and the power supply thereto was turned off; however this sequence may also be changed instead.

For example, a sequence may be used wherein, after the spare board 100c has been set to the "low-power mode," the new standby board 100c and the active board 100a are swapped, the new standby board 100a is set to the "low-power mode," and the power supply to the old standby board 100b is turned off as being the new spare board. Note that in this case, it is possible for the old standby board 100b to perform the switching-determination process instead of the new active board 100c even in the middle of switching over the operation mode of the new standby board 100a.

Moreover, a sequence such as described below may be used. For example, the old standby board 100b is set to the "low-power mode" after the spare board 100c has been set to the "low-power mode" as the new standby board. In this case, it is possible for the new standby board 100c to perform the switching-determination process instead of the active board 100a, even in the middle of the process of switching over the operation mode of the old standby board 100b. After this, one of the standby board 100b and the standby board 100c is swapped with the active board 100a, and the new standby board 100a is used as the new spare board, and the power supply to the new spare board is turned off.

Note that the mode management process in the third embodiment can be applied in the event of the operation mode changeover that occurs due to any of the running modes specified in the settings file 17.

D. Variations

Note that, in the constituent elements in each of the embodiments described above, elements aside from the elements claimed in independent claims are additional elements, and may be omitted as appropriate. The invention is not limited to the embodiments set forth herein, and may be reduced to practice in various other ways without departing from the spirit thereof, such as the following variants.

The hardware structure of the network switching device 1000 in the embodiment is merely one example, and the present invention is not limited thereto. The following illustrates examples of other hardware structures as a first variation and as a second variation.

First Variation

Figure 26:
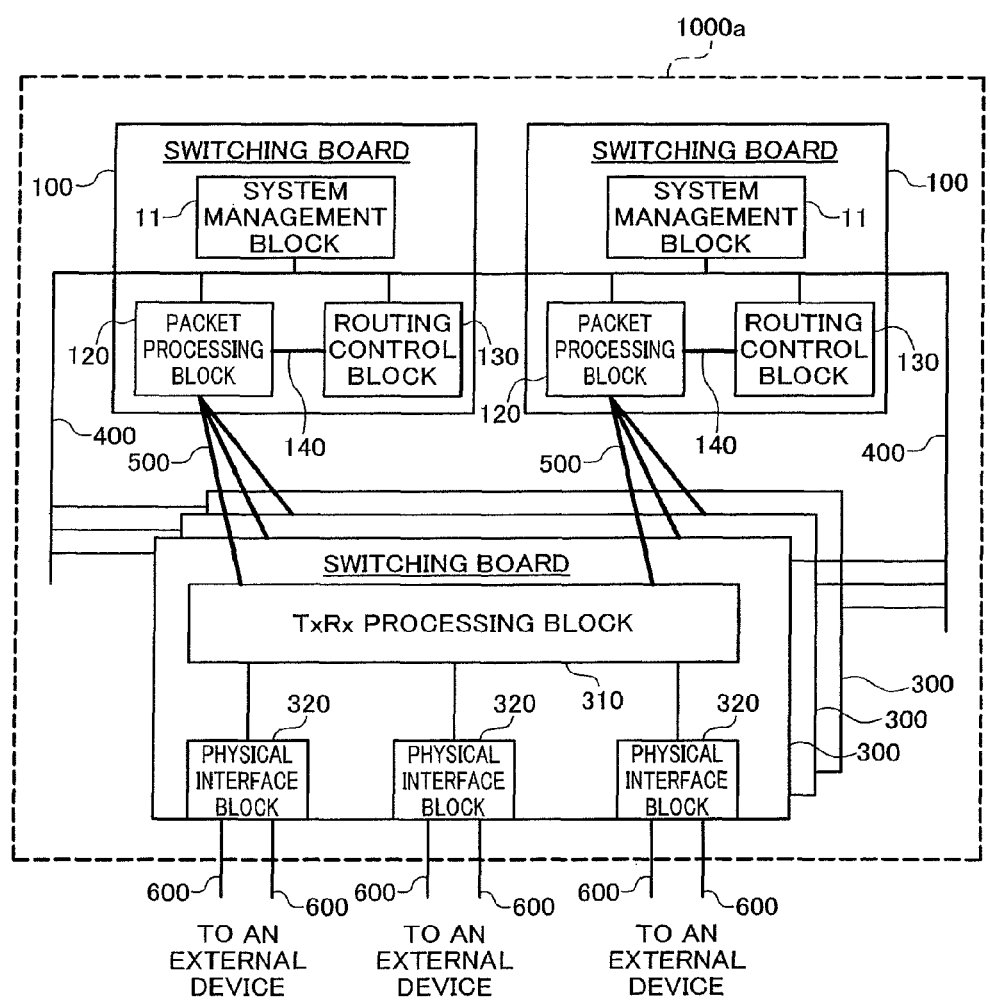
FIG. 26 shows a block diagram of the structure of a network switching device pertaining to a first variation.

FIG. 26 shows a block diagram of the structure of a network switching device 1000a pertaining to a first variation. While in the network switching device 1000 in the embodiment described above the control board 10 and the switching board 100 are separate, in the network switching device 1000a pertaining to the first variation, there is no control board 10, but rather a system management block 11 is provided in a switching board 100. The functions of the other structures and components are the same as in the embodiment, and so the same codes as in FIG. 1 are used in FIG. 26 as well, and explanations thereof are omitted. Even in the network switching device 1000a pertaining to the first variation, it is possible to obtain the same operation and effects as in the embodiment. Moreover, although a figure is omitted, one board may includes the constituent elements of the switching board 100 in FIG. 26 and the constituent elements of the interface board 300 in FIG. 26.

Second Variation

Figure 27:
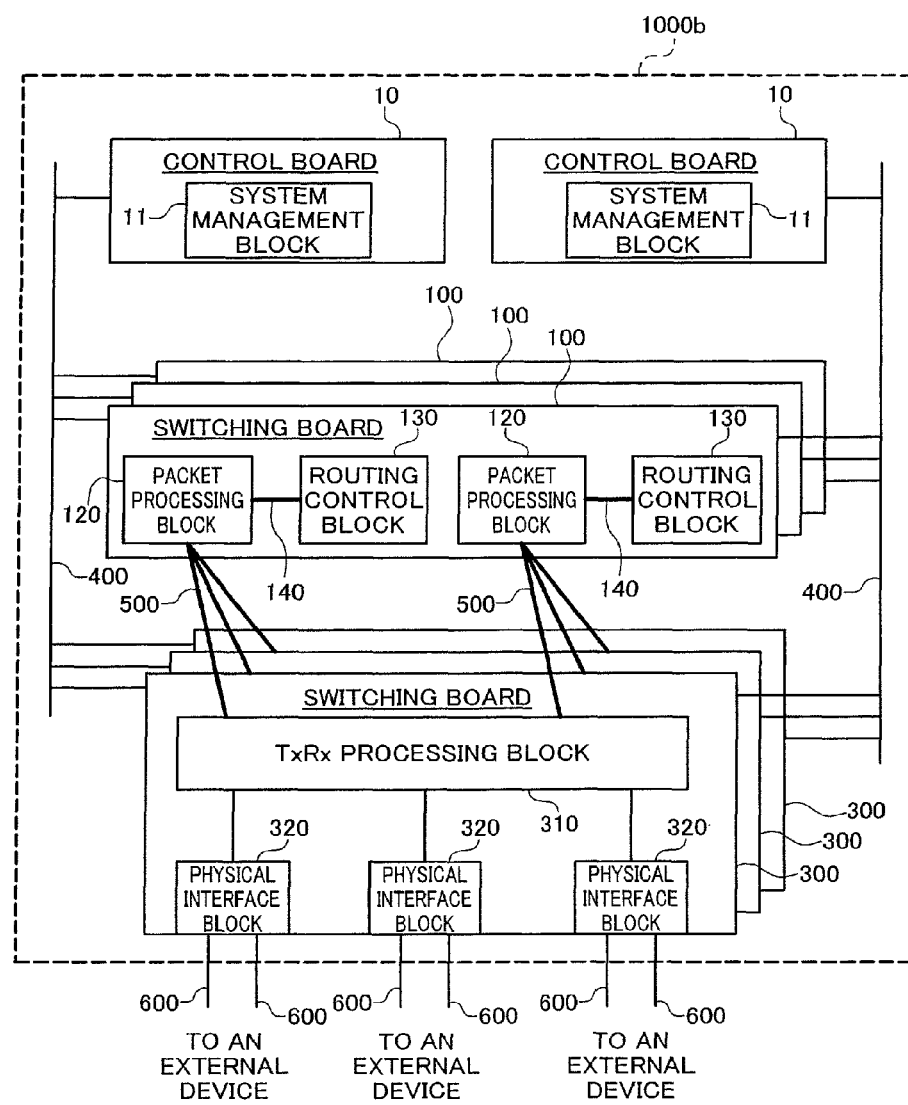
FIG. 27 shows a block diagram of the structure of a network switching device pertaining to a second variation.

FIG. 27 shows a block diagram of the structure of a network switching device 1000b pertaining to a second variation. While in the network switching device pertaining to the embodiment described above, there were two switching boards 100, in the network switching device 1000b pertaining to the second variation, three switching boards 100 are provided. Of the three switching boards 100, two are active boards that perform the packet switching process under normal conditions, and the remaining switching board 100 is a standby board that performs the switch packet processing instead of the active board when failures occur in one of the active boards. In other words, one switching board 100 is a redundant switching board 100.

Here, under normal conditions, that is, during the period of time wherein the standby board is not used for the packets switching process, the system management block 11 prevents a supply of the clock signal to the various structure elements (the packet processing block 120, the routing control block 130, the internal bus 140, and so forth) of the standby board 100. Doing so, overall consumption of electric power by the network switching device 1000 is reduced. Note that when there is a failure in one active board, the provision of the clock signal to each of the constituent elements in the standby board is restarted, where the settings of the another active board wherein no problem has occurred, for example, the content of the forwarding table 134, the content of the IP address table 135 are copied to the standby board through the control bus 400. This makes it possible to swap the standby board 100 with the one active board quickly when a problem occurs. Note that preferably in the standby board, only the control circuit of the control bus 400 for the control board 10 to communicate with the standby board 100 should be supplied with the clock signal and be in a state capable of performing communications, in order to perform the swapping without problems. Moreover, when it comes to communications through the control bus 400, preferably the process of confirming that communications are performed normally is performed at regular periods during normal operations.

The network switching device 1000 in the embodiment described above includes two switching boards; however, the network switching device 1000b in the second variation includes three switching boards 100, as shown in FIG. 27. It is possible to increase the switching capacity by having two of the three switching boards 100 operate in parallel as active boards to perform the packet switching processes. One of the switching boards 100 is used as standby board if a failure occurs in either of the two switching boards 100 as active boards.

If there is no need for a large switching capacity in the network switching device 1000b in the second variation (for example, between 8:00 pm and 7:00 am the next morning in FIG. 6), then the device control unit 11 makes the active board into only a single switching board 100, and makes the other two switching boards 100 into standby boards. In this case, the provision of the clock signal to the various constituent elements in the standby boards may be halted. Doing so reduces the overall switching capacity of the network switching device 1000b because the single active board performs the packet switching processes, but this makes it possible to reduce the consumption of electrical power. The switching of active and standby may be performed dynamically based on monitoring of the traffic load in the network switching device 1000b as a whole. For example, if the traffic load is above a specific threshold, then two switching boards 100 are caused to perform processes as the active board, but when the traffic load is less than a specific threshold value, then a single switching board 100 is caused to perform processes as the active board. Doing this makes it possible to both maintain a large switching capacity when the switching capacity is required, and to reduce the electrical power consumption when the switching capacity is not required.

The switching board 100 in the embodiment described above are provided with a single set of a packet processing block 120, a routing control block 130, and an internal bus 140 (hereinafter termed the "switching processing set"), but in the second variation the switching board 100 is provided with two switching processing sets, as shown in FIG. 27. The switching capacity can be increased by performing the packet switching using the two switching processing sets in parallel.

In the network switching device 1000b pertaining to the second variation, the system management block 11 may stop the provision of the clock signal to a single switching processing set when there is no need for a particularly large switching capacity (for example, between 8:00 pm and 7:00 am the next morning in FIG. 6). Doing so causes the remaining one switching processing set to perform the packet switching process by itself, reducing the switching capacity of the device as a whole, but making it possible to reduce the electric power consumption. Switching between stopping and supplying the clock signal in this way may be performed dynamically based on monitoring of the traffic load in the network switching device 1000 as a whole. For example, if the traffic load is above a specific threshold, then two switching processing sets are caused to perform the packet switching, but when the traffic load is less than a specific threshold value, then a single switching processing set is caused to perform the packet switching. Doing this makes it possible to both maintain a large switching capacity when the switching capacity is required, and to reduce the electrical power consumption when the switching capacity is not required.

Third Variation

Although in the embodiment described above clock signals of two different frequencies were generated through the provision of two frequency oscillators 22 and 23 in the clock generators CL1 through CL7, the type of generating the clock signals is not limited there to. For example, the clock generators may be provided with a single frequency oscillator and a frequency multiplier circuit that multiplies the clock signal by a specific multiplication ratio. Note that the frequency multiplier circuit may be provided within the elements to which the clock signals are applied (such as the packet processing block 120). Note that the control of the frequency multiplier circuit by the system management block 11 may be performed through the transmission of a high or low control signal to the frequency multiplier circuit via a signal line, and may be performed through writing a flag to a control register for the frequency multiplier circuit.

Fourth Variation

Although in the embodiment described above, the operation modes in the network switching device 1000 were controlled at the two levels of high-frequency clock operation versus low-frequency clock operation, control may be performed instead with multilevel operation modes. Specifically, the structure may be one wherein all or part of the clock generators CL1 through CL7 may be structured so as to be able to generate three or more different frequencies, where the frequencies of the clock signals that cause the network switching device 1000 to operate may be changed to multiple levels depending on the traffic or depending on a user setting. Conversely, multilevel operation modes may be performed through changing a portion of the clock generators CL1 through CL7 stepwise, rather than changing the clock generators CL1 through CL7 simultaneously. Specifically, the state wherein all of the clock generators CL1 through CL7 generate the high-frequency clock signal HH can be defined as a first operation mode. The state wherein the clock generators CL1 through CL4, which provide the clock signals to the packet processing block 120, the routing control block 130, and the internal bus 140, are caused to generate the low-frequency clock signal HL, and clock generators CL5 through CL7, which provide clock signals to the external bus 500 and the TxRx processing block 310 are caused to generate the high-frequency clock signal HH may be defined as a second operation mode. The state wherein all of the clock generators CL1 through CL7 are caused to generate the low-frequency clock signal HL may be defined as a third operation mode. Moreover, the network switching device 1000 may be operated through selecting any of the first through third operation modes depending on the traffic load or on a user setting. Here it is possible to change flexibly the balance between the processing performance and the power consumption in the network switching device 1000 through being able to change independently the clock signals that are provided to the switching board 100, the interface board 300, and the external bus 500.

Fifth Variation

The clock frequency may be changed without restarting (resetting the power supply) for some kinds of circuitry among the electronic circuitry that operate synchronized with the clock signals. In the various examples of embodiment described above, the switching board 100 and the interface board 300 (FIG. 3) may be structured using such kind of electronic circuitry. Such a case makes it possible to omit the processes to reset the power supplies (turn off and on the power supplies) of the boards 100 and 300 in the processes that change over the clock frequencies that are used by these boards 100 and 300 (for example, Step S2 in FIG. 12 and Step S5 in FIG. 15). However, even in such a case, when the clock frequency is switched over during the execution of packet switching processing, a problem could occur in the packet switching process. Consequently, when the clock frequency of the switching board 100 used in the switching-determination process is changed, it is still preferable to swap the switching board 100 for which the clock frequency has been changed with another switching board 100 (for example, the active board 100), after the clock frequency changing has been completed for the switching board 100 that is not in execution of the packet switching process (that is, a standby board or a spare board), in the same manner as in the various embodiments described above. Furthermore, even when using an electronic circuitry that does not require a power supply reset, preferably a reset (a power-on reset) is still performed after changing the clock frequency. Doing so makes it possible to prevent the occurrence of problems in the operation of the electronic circuitry caused by changing the clock frequency. Note that, this reset (power-on reset) may be omitted.

Sixth Variation

In the embodiments described above, a switching board 100 whose power supply is turned off under normal circumstances may be used to change over the operation mode of a switching board 100 that is used in the switching-determination process. For example, in the embodiments illustrated in FIG. 11 through FIG. 15, the power supply for the standby board 100 may be turned off under normal circumstances. Specifically, in Step S1 (FIG. 11), the power supply to the second switching board 100b may be turned off. In the next step, Step S2 (FIG. 12), the system management block 11 may startup the second switching board 100b in the "low-power mode" instead of switching over the operation mode in this board 100b. Moreover, after this startup process has been completed, the system management block 11 may swap the first processing board 100a with the second processing board 100b (Step S3 (FIG. 13)). Moreover, in Step S4 (FIG. 14), the system management block 11 may turn off the power supply to the first switching board 100a instead of switching over the operation mode of this board 100a. Conversely, when the operation mode of a switching board 100 is switched over to the "normal mode," the system management block 11 may start up a switching board 100 that is standing by (with the power supply turned off) with the "normal mode" settings. The processing thereafter may be executed following the reverse sequence. These are true also for the second embodiment illustrated in FIG. 16 through FIG. 20.

Moreover, the same is true in the third embodiment illustrated in FIG. 21 through FIG. 25. Specifically, in Step S21 (FIG. 21) the power supply may be turned off for the spare board 100c. In the next step, Step S22 (FIG. 22), the system management block 11 may startup the third switching board 100c with the "low-power mode" settings instead of switching over the operation mode of this board 100c. After this, when the startup process has been completed, the system management block 11 may copy the switching information from the first switching board 100a to the third switching board 100c. The next steps S23 (FIG. 23) and Step S24 (FIG. 24) may be the same as in the third embodiment. In Step S23, the system management block 11 may swap the first switching board 100a and the third switching board 100c. Moreover, in the next step S24, the system management block 11 may change over the operation mode of the first switching board 100a to the "low-power mode." Once this switching has been completed, the system management block 11 may turn off the power supply to the second switching board 100b, instead of switching over the operation mode of this board 100b, and may use the first switching board 100a as the new standby board. Conversely, when the operation mode of a switching board 100 is to be switched over to the "normal mode," the system management block 11 may start up the switching board 100 that is standing by (with the power supply off) with "normal mode" settings. The processes thereafter may be performed following the opposite sequence.

Seventh Variation

In the various embodiment described above, the core clock CC of the TxRx processing block 310 may maintain a constant value regardless of the operation mode of the network switching device (such as the network switching device 1000 in FIG. 1). This makes it possible to change the operation mode of the network switching device without interrupting the packet switching process because it is not necessary to restart the TxRx processing block 310 when switching over the operation mode of the network switching device. For example, the core clock CC of the TxRx processing block 310 may be "high" regardless of the operation mode of the network switching device 1000. In this case, the Step S5 (FIG. 15), the Step S15 (FIG. 20), and the Step S25 (FIG. 25) may be omitted. Regardless of the operation mode of the network switching device, the interface board 300 operates in the "normal mode."

Note that when the operation mode of the network switching device is in the "normal mode," the operation mode of the interface board 300 may be the "normal mode," and, conversely, when the operation mode of the network switching device is in the "low-power mode" the operation mode of the interface board 300 may be the "low-power mode", as in the various embodiments described above. This makes it possible to further reduce the power consumption of the network switching device in the "low-power mode" of the network switching device. Note that the timing with which the operation mode of the interface board 300 is changed (Step S5 in FIG. 15, Step S15 in FIG. 20, and Step S25 in FIG. 25) is not limited to being after completion of the change in the operation mode in the switching board 100, but any given timing may be applied. For example, the timing may be prior to the start of the changing of the operation mode in the switching board 100, or may be during the changing of the operation mode in the switching board 100.

Note that the system management block 100 preferably has both a first changeover mode including changing over the operation mode in the interface board 300, and a second changeover mode without changing over the operation mode in the interface board 300, as changeover modes for the operation modes of the network switching device. Doing so makes it possible for the network switching device to respond to both the needs of the user who emphasizes the continuity of the packet switching process, and of the user who emphasizes reducing power consumption. Note that the first changeover mode is a mode wherein the operation mode of the interface board 300 is changed over when the operation mode of the network switching device is changed over, the same as in the embodiments described above. Furthermore, the second changeover mode is a mode wherein the operation mode of the interface board 300 is not changed when the operation mode of the network switching device is changed over. Not that, the operation mode of the interface board 300 corresponds to the "forwarding-operation mode" in the claims.

Here, the system management block 11 preferably allows the user to select the changeover mode to be used in the operation mode change over process (operation mode management process). Doing so makes it possible to cause the changeover mode to conform to the user preferences. Specifically, the system management block 11 may receive a user instruction, and may selectively perform the mode management process according to the first changeover mode if the user instruction has specified the first changeover mode, and may selectively perform the mode management process according to the second changeover mode if the user instruction has specified the second changeover mode. The system management block 11 may receive a user instruction from any given input device that is connected to the system management block 11 (such as an operating panel, a mouse, or a keyboard). Moreover, the content of the user instruction that has been received may be recorded in the settings file 17 (FIG. 4).

Note that, the conditions for selecting the changeover mode are not limited to the condition following the user instruction such as described above, but any given condition may be employed. For example, the second changeover mode, which has the shorter interruption time, may be selected when the number of lines connected to the network switching device is greater than a specific threshold value. Furthermore, the first changeover mode, which is able to better suppress the power consumption, may be selected when that number of lines is less than that threshold value. Here the system management block 11 may select the changeover mode automatically based on a comparison of the number of lines (for example, the number of physical interface blocks in operation) to the threshold value.

Eighth Variation

In each of the embodiments described above, any given form may be used as the form of the "normal mode" and the "low-power mode" of each of the elements in the network switching device (for example, for the switching board 100 and the interface board 300 in FIG. 3) insofar as the power consumption in the "low-power mode" is less than the power consumption in the "normal mode." For example, the frequency of part of the various clock signals pertaining to the switching board 100 (FIG. 11) (for example, the internal bus clock RC) may be maintained at a specific value regardless of the operating mode of the switching board 100. Moreover, the switching board 100 may have a plurality of electronic circuits that can operate independently from each other, and all of the circuits may operate in the normal mode, on the other hand, the power supply to part of the circuits may be turned off in the low-power mode.

Note that it is preferable to employ a form in which each of the switching block (for example, the switching board 100 in FIG. 3) and the interface block (for example, the interface board 300 in FIG. 3) includes electronic circuitry that operate synchronized with clock signal, and the operation modes is switched by switching the clock frequencies. Doing so makes it possible to change the power consumption easily while preventing complexity in the structure of the electronic circuitry. In any case, the total number of operation modes that can be used is not limited to 2, but rather any given number of operation modes, even three or more, may be employed. Moreover, in any case, it is preferable to reset (power-on reset) the switching block after the operation mode of the switching block has been set. Doing so makes it possible to prevent the occurrence of problems in the operation in the switching block caused by the operation mode being set.

Ninth Variation

In each of the embodiments described above, the switching information need not be limited to information that is the combination of the forwarding table 134 and the IP address table 135, but rather any given information may be employed that establishes the correspondence relationship between the destination address information of packet and the line to which the packet should be sent. For example, the information may be employed which establish the correspondence relationship between the MAC address in an Ethernet™ and the line to which the packet should be sent.

Moreover, in some cases a plurality of physical lines may be combined together and used as a single virtual line (for example, when using a link aggregation function). In such a case, preferably the switching information is set so that all of the plurality of lines in one virtual line is selected as the line to which the packet should be outputted. Other Variations:

A portion of the structure that is achieved in hardware in the embodiment described above may be achieved in software instead, or, conversely, a portion of the structure that is achieved in software in the embodiment described above may be achieved in hardware instead. For example, in the examples of embodiment described above, the packet processing block 120 and the routing control block 130 are structured from an ASIC, but instead may be structured from a general-use processor and a program.

While the present invention have been shown and described on the basis of the embodiments and variations, the embodiments of the invention described herein are merely intended to facilitate understanding of the invention, and implies no limitation thereof. Various modifications and improvements of the invention are possible without departing from the spirit and scope thereof as recited in the appended claims, and these will naturally be included as equivalents in the invention.

Various aspects of the invention are previously discussed in this specification. In an aspect, the one or more second switching blocks preferably include at least one standby switching block. The standby switching block has been started up in a same determination-operation mode as the first switching block and is not performing the switching-determination process. Furthermore, the standby switching block is configured to perform the switching-determination process in place of the first switching block when a problem occurs with the first switching block.

In this arrangement, it is possible to continue the switching-determination process using the same operation mode, using the standby switching block, when a problem occurs with the first switching block.

In the above network switching device, the system control block preferably uses the standby switching block as the target switching block.

In this arrangement, it is possible to use efficiently the standby switching block even when there is no problem with the first switching block.

In the above network switching device, the second switching blocks, preferably, further include at least one spare switching block whose determination-operation mode is set to a determination-operation mode with even less power consumption than the standby switching block, and the system control block uses the spare switching block as the target switching block.

In this arrangement, it is possible to increase the reliability regarding the problems with the switching blocks, even when changing the determination-operation modes, because even if the operation mode of the spare switching block as the target switching block is in the process of being set, the standby switching block is in a backup state that is able to perform the switching-determination process instead of the first switching block.

In the above network switching device, the system control block preferably resets the target switching block following setting the determination-operation mode of the target switching block.

Resetting the target switching block in this way makes it possible to prevent the occurrence of problems in the operation of the target switching block due to the setting of the operation mode.

In each of the above network switching devices, the system control block preferably performs (C) a process of switching the determination-operation mode of the first switching block to the same determination-operation mode as the target switching block after completion of the switchover process.

In this arrangement, it is possible to continue the switching-determination processes using the same determination-operation mode by the first switching block when a problem has occurred in the target switching block that is in execution of the switching-determination processes.

In each of the above network switching devices, the interface block, preferably, is provided with a plurality of switchable forwarding-operation modes as operation modes of sending and receiving the packets. The plurality of forwarding-operation modes includes a first forwarding-operation mode and a second forwarding-operation mode with less power consumption than the first forwarding-operation mode. Furthermore, the mode-process is provided with: a first changeover mode including changing over the forwarding-operation modes; and a second changeover mode without changing over the forwarding-operation modes. In the mode-process in the first changeover mode, the system control block performs: (A1-1) setting the interface block into the first forwarding-operation mode when the determination-operation mode of the target switching block is set to the first determination-operation mode; and (A1-2) setting the interface block into the second forwarding-operation mode when the determination-operation mode of the target switching block is set to the second determination-operation mode.

In this arrangement, it is possible to use a first changeover mode including changing over the forwarding-operation modes, and a second changeover mode without changing over the forwarding-operation modes, thus it is possible to operate with the priority on reducing power consumption, and to operate with the priority on the continuity of the packet switching process.

In each of the above network switching devices, preferably, the first switching block comprises a first memory and the second switching block comprises a second memory. The first memory and the second memory store switching-information. The switching-information is used in the switching-determination process, and the switching-information associates the destination-address information with the line. Furthermore, the system control block performs (D) copying the switching-information stored in the first memory of the first switching block to the second memory of the target switching block, prior to starting the switching-determination process using the target switching block, after completion of the process of setting the determination-operation mode of the target switching block.

In this arrangement, it is possible for the target switching block to perform the same switching-determination process as the first switching block because the switching information that is stored in the first memory of the first switching block is copied to the second memory of the target switching block prior to starting the switching-determination process using the target switching block, after completion of the process of setting the determination-operation mode of the target switching block.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A network switching device, comprising:
one or more switching processing blocks, wherein each switching processing block determines a packet transfer destination based on packets, wherein the packet transfer destination includes destination-address information according to any one of operation modes with different levels of power consumption; and
one or more interface blocks configured to output the packets and destination-address information to the switching processing block in response to receipt from a network, and wherein the one or more interface blocks are further configured to send packets that transfer destination, as determined by the switching processing block, to the network according to an operation mode with predetermined power consumption without depending on the operation modes of the switching processing block.

2. A network switching device according to claim 1, wherein the operation mode of the switching processing block does not depend on an operation mode of at least one of the interface blocks and is switchable based on traffic of the packets to be received or sent by the network switching device.

3. A network switching device according to claim 1, wherein the interface block performs a sending and receiving process for the packets in any one of operation modes with different levels of power consumption, the operation modes being switchable independently from the operation mode of the switching processing block.

4. A network switching device according to claim 1, wherein an operation mode of a first processing block from among the processing blocks is independent from an operation mode of a second processing block from among the processing blocks and is switchable based on an amount of packets received or sent by the network switching device.

5. A network switching device according to claim 1, wherein the operation mode of a first processing block from among the processing blocks does not depend on the operation mode of the second processing block from among the processing blocks and is switchable based on traffic of packets received or sent by the network switching device.

6. A network switching device according to claim 1, further comprising:
a bus that operates in one of an operation modes with different levels of power consumption and transmits packets between the interface block and the switching processing block, wherein the operation mode of the bus is switched over to an operation mode with less power consumption according to a switchover to an operation mode with less power consumption in the switching processing block.

7. A network switching device according to claim 6, further comprising:
a management block that switches at least one of the operation modes of the switching processing block, the interface block, and the bus by controlling frequencies of clock signals supplied to the switching processing block, the interface block, and/or the bus.

8. A network device, comprising:
an interface board including an interface block that is connectable to one or more lines and performs a sending and receiving process for packets with the lines;
a control board including a switching processing block and a system management block, the switching processing block determining a line that is a transfer destination of the packets to be sent or received, the system management block performing a process according to routing protocol; and
a bus that transmits packets between the interface board and the control board, wherein the switching processing block of the control board operates according to any one of operation modes with different levels of power consumption without depending on an operation mode of the interface board that operates with predetermined power consumption.

9. A network device according to claim 8, wherein an operation mode of the switching processing block is switched based on an amount of packets sent and received by the network device.

10. A network device according to claim 8, wherein the bus operates according to any one of operation modes with different levels of power consumption, and an operation mode of the bus is switched according to a switchover of the operation mode of the switching processing block.

11. A network device according to claim 10, wherein when the operation mode of the switching processing block is switched over to an operation mode with less power consumption, the operation mode of the bus in operation is switched over to an operation mode with less power consumption.

12. A network device, comprising:
an interface board including interface blocks that are connectable to one or more lines, operate in operation modes with predetermined power consumption, and perform a sending and receiving process for packets with the lines;
one or more first transfer processing boards including a first switching processing block that is connected to the interface board and determines a line that is a transfer destination of packets processed with the sending and receiving process;
one or more second transfer processing boards including a second switching processing block that is connected to the interface board and determines a line that is a transfer destination of packets processed with the sending and receiving process; and
a first control board and a second control board respectively connected to the first transfer processing boards and the second transfer processing boards, wherein the first switching processing block and the second switching processing block are redundantly configured to be an active system and a standby system, and wherein, without depending on an operation mode of the interface board, an active switching processing block is set to a first mode that operates with predetermined power consumption, and a standby switching processing block is set to a second mode that stands by with power consumption less than the power consumption of the first mode.

* * * * *